US 011276000B2

(12) United States Patent
Yamada et al.

(10) Patent No.: US 11,276,000 B2
(45) Date of Patent: Mar. 15, 2022

(54) IMAGE ANALYSIS METHOD, IMAGE ANALYSIS APPARATUS AND LEARNED DEEP LAYER LEARNING ALGORITHM MANUFACTURING METHOD

(71) Applicant: Sysmex Corporation, Kobe (JP)

(72) Inventors: Kohei Yamada, Kobe (JP); Kazumi Hakamada, Kobe (JP); Yuki Aihara, Kobe (JP); Kanako Masumoto, Kobe (JP); Yosuke Sekiguchi, Kobe (JP); Krupali Jain, Kobe (JP)

(73) Assignee: SYSMEX CORPORATION, Kobe (JP)

(*) Notice: Subject to any disclaimer, the term of this patent is extended or adjusted under 35 U.S.C. 154(b) by 12 days.

(21) Appl. No.: 16/284,451

(22) Filed: Feb. 25, 2019

(65) Prior Publication Data

US 2019/0266486 A1 Aug. 29, 2019

(30) Foreign Application Priority Data

Feb. 27, 2018 (JP) .............................. JP2018-032757

(51) Int. Cl.
*G06N 3/08* (2006.01)
*G06N 20/00* (2019.01)
(Continued)

(52) U.S. Cl.
CPC ............ *G06N 3/08* (2013.01); *G06K 9/00147* (2013.01); *G06K 9/4604* (2013.01); *G06K 9/4652* (2013.01); *G06N 20/00* (2019.01); *G06T 7/0012* (2013.01); *G06T 2207/20081* (2013.01); *G06T 2207/20084* (2013.01); *G06T 2207/30024* (2013.01)

(58) Field of Classification Search
CPC ........ G06N 3/08; G06N 20/00; G06T 7/0012; G06T 2207/30024; G06T 2207/20081; G06T 2207/20084
USPC ...................................................... 382/156
See application file for complete search history.

(56) References Cited

U.S. PATENT DOCUMENTS 10,629,305 B2 * 4/2020 Muller .................. G16H 50/70
2010/0004915 A1 1/2010 Miller et al.
(Continued)

FOREIGN PATENT DOCUMENTS

| JP | 5321145 B2 | 7/2013 |
| JP | 5478618 B2 | 2/2014 |
| JP | 2019-095212 A | 6/2019 |

OTHER PUBLICATIONS

"HE-stain image analysis software", Pathology Image Analysis System, e-Pathologist, Apr. 2015, 2 pages.
(Continued)

*Primary Examiner* — Congvan Tran
(74) *Attorney, Agent, or Firm* — Buchanan Ingersoll & Rooney PC

(57) ABSTRACT

An image analysis method for analyzing an image of a tissue collected from a subject using a deep learning algorithm of a neural network structure. The image analysis method includes generating analysis data from the analysis target image that includes the tissue to be analyzed, inputting the analysis data to a deep learning algorithm, and generating data indicating a layer structure configuring a tissue in the analysis target image by the deep learning algorithm.

21 Claims, 21 Drawing Sheets

(51) Int. Cl.
*G06T 7/00* (2017.01)
*G06K 9/46* (2006.01)
*G06K 9/00* (2022.01)

(56) References Cited

U.S. PATENT DOCUMENTS

| | | | |
|---|---|---|---|
| 2012/0004514 | A1 | 1/2012 | Marugame |
| 2018/0232883 | A1* | 8/2018 | Sethi .................. G06K 9/628 |
| 2018/0247153 | A1* | 8/2018 | Ganapati ............. A61B 1/005 |
| 2019/0139642 | A1* | 5/2019 | Roberge ............. G16H 15/00 |
| 2019/0156476 | A1* | 5/2019 | Yoshida ............. G06K 9/6269 |
| 2019/0156481 | A1* | 5/2019 | Sekiguchi ......... G06K 9/00147 |
| 2019/0205606 | A1* | 7/2019 | Zhou .................. G06N 3/0445 |
| 2019/0287274 | A1* | 9/2019 | Ariga ................. G01N 23/046 |
| 2020/0066407 | A1* | 2/2020 | Stumpe ............... G06T 11/001 |
| 2020/0097701 | A1* | 3/2020 | Chukka ............. G06K 9/6274 |
| 2020/0129263 | A1* | 4/2020 | Izadyyazdanabadi ................. G06K 9/00134 |

OTHER PUBLICATIONS

Lynch, D A F, et al., "Correlation between epithelial cell proliferation and histological grading in gastric mucosa", J Clin Pathol, 1999, vol. 52, pp. 367-371.

Sirinukunwattana, Korsuk, et al., "Locality Sensitive Deep Learning for Detection and Classification of Nuclei in Routine Colon Cancer Histology Images", Accepted for Publication in IEEE Transactions on Medical Imaging, Feb. 2016, pp. 1-12.

Xu et al., "A Deep Convolutional Neural Network for segmenting and classifying epithelial and stromal regions in histopathological images," Neurocomputing, (May 26, 2016), vol. 191, pp. 214-423. (27 pages).

Xing et al., "An Automatic Learning-Based Framework for Robust Nucleus Segmentation," IEEE Transactions on Medical Imaging, (Feb. 2016), vol. 35, No. 2, pp. 550-566.

The extended European Eearch Report dated May 31, 2019, by the European Patent Office in corresponding European Patent Application No. 19159672.5. (9 pages).

Communication pursuant to Article 94(3) EPC dated Sep. 4, 2020, by the European Patent Office in corresponding European Patent Application No. 19159672.5. (7 pages).

Summons to attend oral proceedings pursuant to Rule 115(1) EPC issued on Jun. 7, 2021, in corresponding European Patent Application No. 19159672.5. (11 pages).

Notice of Reasons for Refusal dated Nov. 16, 2021, by the Japanese Patent Office in corresponding Japanese Application No. 2018-032757 and an English translation of the Notice. (7 pages).

* cited by examiner

FIG. 4A
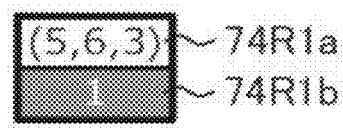
FIG. 4B
FIG. 4C
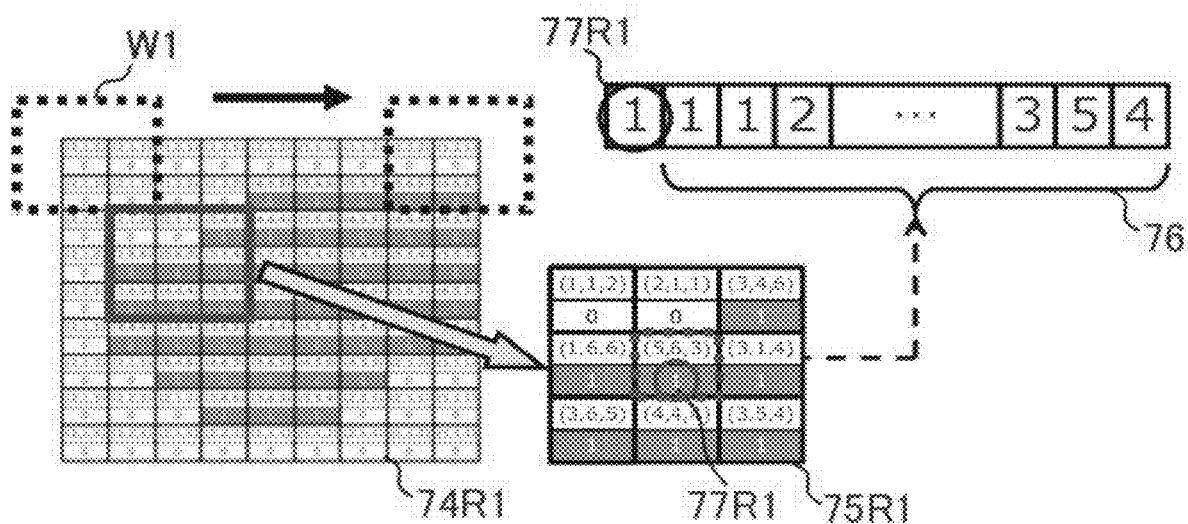

IMAGE ANALYSIS METHOD, IMAGE ANALYSIS APPARATUS AND LEARNED DEEP LAYER LEARNING ALGORITHM MANUFACTURING METHOD

CROSS REFERENCE TO RELATED APPLICATION

This application claims priority from prior Japanese Patent Application No. 2018-032757, filed on Feb. 27, 2018, entitled "IMAGE ANALYSIS METHOD, IMAGE ANALYSIS APPARATUS, PROGRAM, LEARNED DEEP LAYER LEARNING ALGORITHM MANUFACTURING METHOD AND LEARNED DEEP LAYER LEARNING ALGORITHM", the entire contents of which are incorporated herein by reference.

FIELD OF THE INVENTION

The present invention relates to an image analysis method, an image analysis apparatus, a program, a method for manufacturing a learned deep layer learning algorithm, and a learned deep layer learning algorithm. More specifically, the present invention relates to an image analysis method, an image analysis apparatus, a program, a method for manufacturing a learned deep layer learning algorithm, and a learned deep layer learning algorithm, which generates data indicating a layer structure configuring a tissue in a tissue image.

BACKGROUND

In the medical field, diagnosis is performed using the tissue collected from the subject. For example, Sydney classification is used as a method for quantitatively evaluating and classifying gastritis clinically (DAF Lynch, J Clin Pathol 1999; 52: 367-371). In order to quantitatively evaluate the severity of gastritis, Sydney classification uses *H. pylori* infection, neutrophil infiltration, degree of chronic inflammation, atrophy of ducts, and intestinal epithelialization as indices.

SUMMARY OF THE INVENTION

Atrophy and hyperplasia of the epithelial cell layer of ducts and the like are phenomena observed not only in the stomach but also in various tissues accompanying inflammation and the like. Evaluation of the epithelial cell layer is generally carried out by preparing paraffin-embedded sections from a biopsy material collected in endoscopic examination, and observing pathological tissue samples stained with hematoxylin and eosin by a pathologist.

However, an evaluation of the degree of atrophy by visual inspection through a microscope is a visual evaluation, which may vary for each pathologist and depend on the skill of the pathologist, making reproducible evaluation difficult.

The present invention provides an image analysis method, an image analysis apparatus, a non-transitory storage medium, a method for manufacturing a learned deep layer learning algorithm, and a learned depth layer learning algorithm capable of evaluating a layer structure configuring tissue based on definite criteria.

One embodiment relates to an image analysis method for analyzing an image of a tissue collected from a subject using a deep learning algorithm (60) of a neural network structure. The image analysis method includes generating analysis data (80) from an analysis target image (78) including an analysis target tissue, inputting the analysis data (80) to a deep learning algorithm (60), and generating data indicating the layer structure configuring the tissue in the analysis target image (78). According to the present embodiment, it is possible to quantitatively evaluate a layer structure configuring a tissue using certain criteria of the deep learning algorithm. In this way it is possible to suppress variations due to the proficiency of the pathologist and the like, and to perform reproducible evaluations.

In the embodiment, the analysis target image (78) is an image of a sample for histological diagnosis, preferably a bright field image of a stained analysis target tissue. According to one embodiment, histological diagnosis can be assisted.

In the embodiment, in the generating the data indicating a layer structure, data indicating a nucleus region of at least one layer structure in the analysis target tissue is generated based on the analysis data, by the deep learning algorithm (60).

In the embodiment, the layer structure includes at least one selected from an epithelial cell layer, an endothelial cell layer, a connective tissue layer, and a muscular layer.

In the above embodiment, the tissue is collected from the stomach, small intestine, or large intestine, and the layer structure is at least one selected from the group including a mucosal epithelial cell layer, a mucosal lamina propria, a muscularis mucosae, a submucosa, an intrinsic muscle layer, and a serosal layer. According to this embodiment, it is possible to discriminate the layer structure configuring the gastrointestinal tissue.

In the embodiment, the tissue is collect from the trachea or bronchus, and the layer structure is at least one selected from a mucosal epithelial cell layer, a mucosal lamina propria, a smooth muscle layer, a submucosal layer, and an adventitia layer Including one. According to this embodiment, it is possible to discriminate the layer structure configuring the respiratory tissue.

In the embodiment, the tissue is collected from the uterine body, and the layer structure includes at least one selected from a mucosal epithelial cell layer, a mucosal lamina propria, a muscle layer, and an adventitia layer. According to this embodiment, it is possible to discriminate the layer structure configuring the tissue of the uterine body.

In the embodiment, the tissue is collected from the gall bladder, and the layer structure includes at least one selected from the mucosal epithelial cell layer, mucosal lamina propria, muscular layer, and serosal layer. According to this embodiment, it is possible to discriminate the layer structure configuring the gallbladder tissue.

In the embodiment, the tissue is glandular tissue collected from tissues other than the stomach, small intestine, large intestine and uterus, and the layer structure is at least one selected from the glandular epithelial cell layer, the muscular layer, and the connective tissue layer. According to this embodiment, it is possible to discriminate the layer structure configuring the tissues other than the stomach, small intestine, large intestine and uterus.

In the embodiment, the tissue is a heart, and the layer structure includes at least one selected from an endocardial layer, a myocardium layer, an epicardial layer, and an epicardial tissue. According to this embodiment, it is possible to discriminate the layer structure configuring the tissue of the heart.

In the embodiment, the tissue is a blood vessel, and the layer structure includes at least one selected from an endothelial cell layer and a muscle layer. According to this embodiment, it is possible to discriminate the layer structure configuring the tissue of the blood vessel.

In the embodiment, the data indicating the layer structure configuring the tissue are data for distinguishing a plurality of types of layers configuring the tissue. According to this embodiment, the user can grasp at a glance the layer structure configuring the tissue to be analyzed.

In the embodiment, in the generating analysis data from an analysis target image, a plurality of analysis data (80) are generated for each region having a predetermined number of pixels relative from one analysis target image (78). In the deep learning algorithm, a label value indicating a layer structure also is attached to each of the input analysis datum for each pixel. According to this embodiment, it is possible to present the structure of the layer structure for a plurality of parts of the analysis target image (78).

In the above embodiment, the deep learning algorithm (50) has learned the training data generated from bright field images (70R1, 70R2, 70R3) for learning imaged under a bright field microscope of a stained image of the sample prepared by staining for bright field observation of the tissue collected from a subject, and fluorescence images (71T1, 71R2, 71R3) of a cell nucleus imaged under fluorescence observation of a fluorescence microscope of a stained image of a sample prepared by fluorescence nuclear staining of the same sample or a corresponding sample, wherein the position of the fluorescence image in the sample is generated from the fluorescence image for learning corresponding to the position in the sample of the acquired bright field image. According to this embodiment, the nuclear region of the analysis target image (78) can be learned by the deep learning algorithm (50).

In the embodiment, the training data include a label value indicating the layer structure for each pixel of the bright field image for learning. According to this embodiment, each region of each pixel of the analysis target image (78) can be learned.

In the previous embodiment, the training data are generated for each region of a predetermined number of pixels in the bright field image. According to this embodiment, the learning efficiency of the deep learning algorithm (50) can be improved.

In the embodiment, the deep learning algorithm classifies the analysis data into classes indicating a layer structure configuring a tissue included in the analysis target image (78). According to this embodiment, it is possible to indicate the layer structure configuring the tissue included in the analysis target image (78).

In the above embodiment, the output layer (50*b*) of the neural network (50) is a node whose softmax function is an activation function. According to this embodiment, the learning efficiency of the deep learning algorithm (50) can be improved.

Each time the analysis data (80) are input, the deep learning algorithm (60) generates data indicating the layer structure configuring the tissue included in the analysis target image (80) for each unit pixel. According to this embodiment, it is possible to improve the analysis efficiency of the deep learning algorithm (60). According to the embodiment, the depth learning algorithm (60) is generated according to the organ from which the analysis target tissue is collected. According to this embodiment, it is possible to improve the analysis efficiency of the deep learning algorithm (60).

In the embodiment, the deep learning algorithm (60) also is prepared according to the organ from which the analysis target tissue is collected, and a deep learning algorithm (60) corresponding to the organ is used to process the analysis data. According to this embodiment, it is possible to improve the analysis efficiency of the deep learning algorithm (60).

The embodiment also calculates the thickness of the layer structure based on the data indicating the layer structure. Determining the grade of the disease based on the thickness of the layer structure is also included. According to this embodiment, the thickness of each layer structure can be grasped and disease grading can be performed without depending on the eyes of a pathologist.

One embodiment relates to an image analysis apparatus (100) for analyzing an image of a tissue collected from a subject using a deep learning algorithm (60) of a neural network structure. The image analysis apparatus (100) is provided with a processing unit (10) for generating data indicating the layer structure configuring the tissue in the analysis target image (78) by the deep learning algorithm (60) by generating analysis data (80) from the analysis target image (78) including the tissue or cell to be analyzed, inputting the analysis data (80) to the deep learning algorithm (60). According to the present embodiment, it is possible to discriminate a layer structure configuring a tissue using certain criteria of the deep learning algorithm.

One embodiment relates to a non-transitory storage medium which stores a computer program for analyzing an image of a tissue collect from a subject using a deep learning algorithm (60) of a neural network structure. The computer program causes a computer to execute a process of generating analysis data (80) from an analysis target image (78) including a tissue or a cell to be analyzed, a process of generating analysis data (80) in a deep learning algorithm (60), and a process of generating data indicating the layer structure configuring the tissue in the analysis target image (78) by the deep learning algorithm (60). According to the present embodiment, it is possible to discriminate a layer structure configuring a tissue using certain criteria of the deep learning algorithm.

One embodiment relates to a method for generating a learned deep learning algorithm (60) that includes a first acquiring step of acquiring first training data (72R1*r*, 72R1*g*, 72R1*b*) corresponding to a first training image (70R1) including a layer structure of a first learning object included in a training image; a second acquiring step of acquiring second training data (73R1) corresponding to a second training image (71R1) indicating a nuclear region in the first training image (70R1); a third acquiring step of acquiring third training data (72R2*r*, 72R12, 72R2*b*) for a third training image (70R2) including the layer structure of the second learning object included in the training image; a fourth acquiring step of acquiring fourth training data (73R2) corresponding to a fourth training image (71R2) indicating a nuclear region in the third training image (70R2); a fifth acquiring step of acquiring fifth training data (72R3*r*, 72R3*g*, 72R3*b*) for the fifth training image (70R3) including the layer structure of the third learning object included in the training image; a sixth acquiring step of acquiring sixth training data (73R3) corresponding to a sixth training image (71R3) indicating a nuclear region in the fifth training image (70R3); a learning step of causing the neural network (50) to learn the relationship between the first training data (72R1*r*, 72R1*g*, 72R1*b*) and the second training data (73R1); a learning step of causing the neural network (50) to learn the relationship between the third training data (72R2*r*, 72R2*g*, 72R2*b*) and the fourth training data (73R2); and a learning step of causing the neural network to learn a relationship between the fifth training data (72R3*r*, 72R3*g*, 72R3*b*) and the sixth training data (73R3). According to the present embodiment, it is possible to generate a deep learning algorithm that can discriminate layer structures configuring a tissue.

In the embodiment of the generation method, the first training data (72R1r, 72R1g, 72R1b), the third training data (72R2r, 72R2g, 72R2b), the fifth training data (72R3r, 72R3g, 72R3b) are the input layer (50a) of the neural network (50), the second training data (73R1), the fourth training data (73R2), and the sixth training data (73R3) are the output layer (50b) of the neural network (50) respectively corresponding to the first training data (72R1r, 72R1g, 72R1b), the third training data (72R2r, 72R2g, 72R2b) and the fifth training data (72R3r, 72R3g, 72R3b). The present embodiment also includes a step of generating the first training data (72R1r, 72R1g, 72R1b) from the first training image (70R1) before the first obtaining step; a step of generating the second training data (70R2) from the second training image before the second obtaining step; a step of generating the third training data (72R2r, 72R2g, 72R2b) from the third training image (70R3) before the third obtaining step; a step of generating fourth training data (73R2) from the fourth training image (71R2) before the fourth obtaining step; a step of generating the fifth training data (72R3r, 72R3g, 72R3b) from the fifth training image (70R3) before the fifth obtaining step; and a step of generating the sixth training data (73R3) from the sixth training image (71R3) before the sixth obtaining step. According to the present embodiment, it is possible to generate a deep learning algorithm that can discriminate layer structures configuring a tissue.

In one embodiment, is a learned deep learning neural network in which the first training data (72R1r, 72R1g, 72R1b), the third training data (72R2r, 72R2g, 72R2b) and the fifth training data (72R3r, 72R3g, 72R3b) are the input layer (50a) of the neural network (50), the second training data (73R1), the fourth training data (73R2), and the sixth training data (73R3) are the output layer (50b) of the neural network (50) corresponding to first training data (72R1r, 72R1g, 72R1b), the third training data (72R2r, 72R2g, 72R2b), and fifth training data (72R3r, 72R3g, 72R3b); wherein the first training data (72R1r, 72R1g, 72R1b) are generated from a first training image (70R1) including the layer structure of the first learning object included in the training image, the second training data (73R1) indicates a nuclear region in the first training image (70R1), the third training data (72R2r, 72R2g, 72R2b) are generated from a third training image (70R2) including the layer structure of the second learning object included in the training image, the fourth training data (73R2) indicate a nuclear region in the third training image (70R2), the fifth training data (72R3r, 72R3g, 72R3b) ares generated from the fifth training image (70R3) including the layer structure of the third learning object included in the training image, and the sixth training data (73R3) indicate a nucleus region in the fifth training image (70R3). According to the present embodiment, it is possible to provide a deep learning algorithm capable of discriminating the layer structure configuring a tissue under certain conditions.

It becomes possible to distinguish the layer structure configuring a tissue using certain criteria of a deep learning algorithm.

BRIEF DESCRIPTION OF THE DRAWINGS

FIGS. 4A, 4B and 4C are schematic diagram illustrating the details of training data;

FIGS. 5A and 5B are schematic diagram illustrating the details of training data;

FIG. 21 is an analysis result of a tissue obtained from the stomach.

DESCRIPTION OF THE EMBODIMENTS OF THE INVENTION

Figure 1:
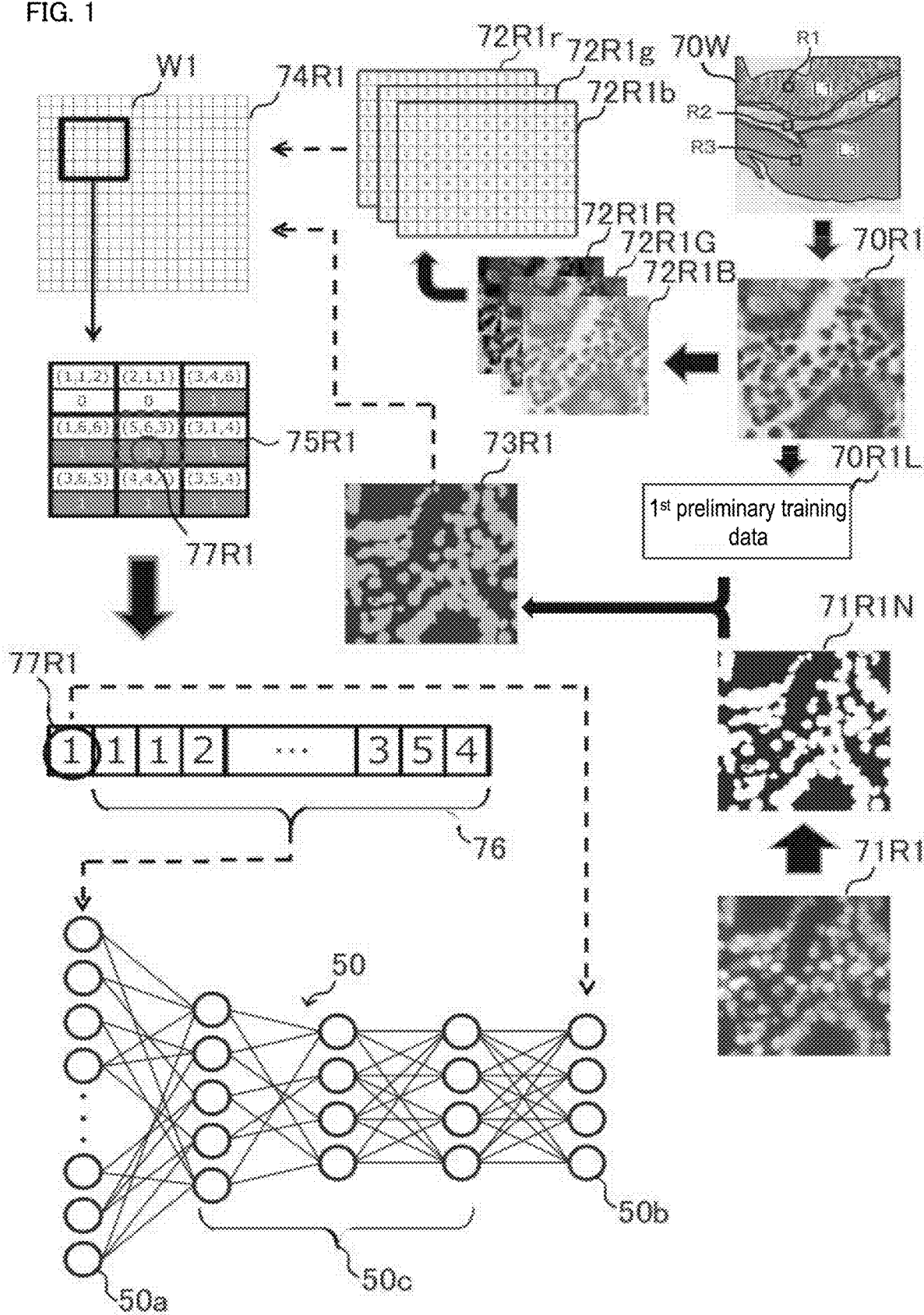
FIG. 1 is a schematic diagram illustrating summary of a deep learning method.

Hereinafter, summary and an embodiment of the present invention will be described in detail with reference to the accompanying drawings. Note that in the following description and drawings the same reference numerals denote the same or similar constituent elements, and therefore, descriptions of the same or similar constituent elements are omitted.

The image analysis method is an image analysis method for analyzing an image of a tissue, and uses a deep learning algorithm of a neural network structure, preferably a convolutional neural network structure. The image analysis method can distinguish a layer structure configuring a tissue to be analyzed.

In the present invention, the image of the tissue is an image acquired from the tissue sample. Tissue is collected from a subject. The sample is not particularly limited, but is preferably a mammal, and more preferably a human. Whether a subject is alive or deceased when a tissue is collected from the subject irrelevant. The organ is not limited insofar as it exists in the subject. For example, the organ includes cardiac organs (heart, artery, vein, lymph vessel and the like), respiratory organs (nasal cavity, paranasal sinus, larynx, trachea, bronchus, lung and the like), gastrointestinal organs (lips, tongue, salivary gland, pharynx, esophagus, stomach, duodenum, jejunum, ileum, cecum, appendix, ascending colon, transverse colon, sigmoid colon, rectum, anus, liver, gall bladder, bile duct, biliary tract, pancreas, pancreatic duct, and the like), urological organs (prostate, testis, epididymis, vas deferens, and the like), female reproductive organs (ovary, oviduct, uterine body, uterine cervix, vagina, and the like), male reproductive organs (urethra, bladder, ureter, kidney), endocrine system organs (thyroid gland, parathyroid gland, and the like), integumentary organs (skin, hair, nails, and the like), sensory organs (eyeball, lacrimal gland, and the like). In the present invention, the tissue of interest is preferably a tissue other than the stomach, small intestine (duodenum, jejunum, ileum), large intestine (colon, rectum), trachea or bronchus, uterine body, gall bladder, stomach, small intestine, glandular tissue (salivary gland, pancreas, thyroid gland and the like) collected from glandular tissue (salivary gland, pancreas, thyroid and the like), heart, blood vessel, retina and the like.

Generally, many of the tissues are composed of several different cells and different extracellular matrices. Then, these cells and the extracellular matrices are bound to like cells and like extracellular matrices, or between cells and extracellular matrices to form a layer structure in the tissue. Many tissues can be composed at least from the external side of epithelial cell layer, connective tissue layer (connective tissue, fibroblast, lymphocyte, neutrophil, macrophage, blood vessel, plexus and the like, depending on internal organs, including submucosal layer), and muscular layer (mainly smooth muscle layer). For example, gastrointestinal tracts such as the stomach, small intestine, and large intestine are composed of mucosal epithelial cell layer, mucosal lamina propria (composed of connective tissue, fibroblasts, lymphocytes, neutrophils, macrophages, blood vessels, plexus and the like, muscularis mucosae (composed of smooth muscle cells and smooth muscle and the like), submucosa (composed of connective tissue, fibroblasts, lymphocytes, neutrophils, macrophages, blood vessels, plexus and the like), an intrinsic muscular layer (composed of smooth muscle and smooth muscle cells and the like), a serosal layer and the like. The intrinsic muscular layer can be composed of two layers, an inner circular muscle and an external longitudinal muscle.

The esophagus has almost the same layered structure as the stomach and the like, but the epithelial cell layer is composed of a stratified squamous epithelial cell layer instead of a mucosal epithelial cell layer.

The trachea and bronchi are also composed of a mucosal epithelial cell layer, a mucosal lamina propria, a smooth muscle layer, a submucosal layer, an adventitia layer and the like. Part of the trachea and bronchi include a cartilage layer in place of the smooth muscle layer.

The uterus includes the epithelial cell layer, the muscular layer, and the adventitial layer. The uterus has different epithelial cell layers in the body and neck. The epithelial cell layer in the uterine body is the mucosal epithelial cell layer, but the epithelial cell layer in the uterine neck is composed of the stratified squamous epithelial cell layer and the like. The gall bladder configured of a mucosal epithelial cell layer, a mucosal lamina propria, a muscle layer, and a serosal layer.

Gastric, small intestine, large intestine and glandular tissue other than the uterus can be divided into glandular epithelial cell layer, muscle layer, connective tissue layer (which can be composed of connective tissue, fibroblasts, lymphocytes, neutrophils, macrophages, blood vessels and the like).

Since the heart and blood vessels are not organs linked to the outside of the body, the heart and blood vessels have an inner membrane (endothelial cell) layer, muscular layer (including smooth muscle fibers, smooth muscle cells, elastic fibers and the like), outer membrane layer and the like from the inside to the outside with the cavity side as the inside. Specifically, the heart is composed of an endocardial layer, a myocardium layer, an epicardial layer, an epicardial tissue and the like. The blood vessel is composed of an endothelial cell layer, a muscle layer and the like.

The retina is configured by a rod pyramidal layer, an outer granular layer, an outer reticular layer, an inner granular layer, an inner reticular layer and a ganglion cell layer and the like.

The sample is intended to be processed in such a manner that the tissue can be observed with a microscope or the like, for example, a preparation. The sample can be prepared according to a known method. For example, in tissue samples, tissue is collected from the sample, the tissue is fixed with a predetermined fixative solution (formalin fixative or the like), the fixed tissue is embedded in paraffin, and the paraffin-embedded tissue is sliced. The sliced section is placed on a glass. The sample is completed by subjecting the slide glass with slices to staining for observation with an optical microscope, that is, for bright field observation, and performing prescribed encapsulation treatment. A typical example of a tissue sample is a tissue diagnostic sample (pathological sample), and the staining is a hematoxylin/eosin (HE) staining.

For the image analysis, a learned deep layer learning algorithm trained using four types of training images is used. The image analysis generates analysis data from an analysis target image including tissue to be analyzed acquired from the sample. Analysis data are input to the deep learning algorithm and data indicating a layer structure of tissue present in the analysis target image are generated. The data indicating the layer structure are data indicating the layer structure of the above-mentioned layer structure of the tissue at the position of the pixel of interest in the discrimination target. The data indicating the layer structure are data indicating which nucleus of the layer structure the nucleus region existing in the target pixel corresponds to. The data indicating the layer structure may be a label value, a display, or the like capable of distinguishing which nucleus corresponds to the nucleus of any of the above-described layer structures.

The training image is acquired from one or more layer structures of the tissue to be learned. Preferably, the training image is acquired for each layer structure from a plurality of layer structures included in a tissue to be learned.

For example, the first training image 70R1 is an image acquired from a first layer structure (for example, an epithelial cell layer or an endothelial cell layer) included in a tissue collected from a subject. This image is obtained from a sample stained so that the tissue structure can be recognized by microscopic observation. Although the staining is not limited insofar as the tissue structure can be recognized, the staining is preferably a staining for bright field observation. The above-described bright field observation staining is not limited insofar as at least the cell nucleus and a part other than the cell nucleus can be stained so as to be distinguishable by hue. When the sample is a mammalian tissue sample, for example, HE staining can be mentioned. From the first training image 70R1, the first training data 72R1*r*, 72R1*g*, 72R1*b* and the first preliminary training data 70R1L are generated. The first training data 72R1*r*, 72R1*g*, 72R1*b* are information on a single color image obtained by separating the hue included in the first training image 70R1 for each primary color. The first preliminary training data 70R1L are generated as binarized data (label value) indicating that the layer structure included in the first training image 70R1 are the first layer structure. The layer structure included in the first training image 70R1 is determined to be the first layer structure by, for example, sample observation by an examiner or the like.

The second training image 71R1 included in the training images indicates where in the first training image 70R1 is the nucleus region of the cell, that is, the correct answer is "it is a nucleus region". The image of the cell is preferably an image showing a nuclear region of the first layer structure. This image is a captured image that is subjected to fluorescent nuclear staining to selectively staining the cell nucleus relative to a sample that is the same as the sample from which the first training image 70R1 is acquired, or a sample (for example, consecutively sliced sample) corresponding to the sample from which the first training image 70R1 was acquired. The fluorescent nucleus stain includes, but is not limited to, 4', 6-diamidino-2-phenylindole (DAPI) stain. From the second training image 71R1, the second preliminary training data 71R1N are generated. The second preliminary training data 71R1N are binarized data generated by binarizing the second training image 71R1, and indicate either a region of the cell nucleus or another region.

The second preliminary training data 71R1N and the first preliminary training data 70R1L are associated with each pixel. In the second preliminary training data 71R1N, a label indicating the nucleus region of the first layer structure is further given to the pixel indicating the cell nucleus region. Data in which a label value indicating "a nucleus region of the first layer structure" is added to the region of the cell nucleus in the second preliminary training data 71R1N are used as the second training data 73R1.

The third training image 70R2 included in the training image is an image acquired from the second layer structure (that is, connective tissue layer) included in the tissue from which the first training image 70R1 was acquired. This image is obtained from a sample stained so that the tissue structure can be recognized by microscopic observation. Although the staining is not limited insofar as the tissue structure can be recognized, the staining is preferably a staining for bright field observation. The above-described bright field observation staining is not limited insofar as at least the cell nucleus and a part other than the cell nucleus can be stained so as to be distinguishable by hue. When the sample is a mammalian tissue sample, for example, HE staining can be mentioned. It is preferable that the staining is the same as the sample from which the first training image 70R1 is acquired.

From the third training image 70R2, the third training data 72R2*r*, 72R2*g*, 72R2*b* and the third preliminary training data 70R2L are generated. The third training data 72R2*r*, 72R2*g*, 72R2*b* are information on a single color image obtained by separating the hue included in the third training image 70R2 for each primary color. The third preliminary training data 70R21L are generated as binarized data (label value) indicating that the layer structure included in the third training image 70R2 are the third layer structure. The layer structure included in the third training image 70R2 is determined to be the third layer structure by, for example, sample observation by an examiner or the like.

The fourth training image 71R2 included in the training images indicates where in the fourth training image 71R2 is the nucleus region of the cell, that is, the correct answer is "a nucleus region". This image is a captured image that is subjected to fluorescent nuclear staining to selectively stain the cell nucleus relative to a sample that is the same as the sample from which the third training image 70R2 is acquired, or a sample (for example, consecutively sliced sample) corresponding to the sample from which the third training image 70R21 was acquired. Although the fluorescent nucleus stain is not limited, it is preferable that the fluorescent nucleus stain is the same as the fluorescent nucleus stain performed on the sample at the time of acquiring the second training image 71R1. From the fourth training image 71R2, the fourth preliminary training data 71R2N are generated. The fourth preliminary training data 71R2N are binarized data generated by binarizing the fourth training image 71R2, and indicate either a region of the cell nucleus or another region.

The fourth preliminary training data 71R2N and the third preliminary training data 70R2L are associated with each pixel. In the fourth preliminary training data 71R2N, a label indicating the nucleus region of the second layer structure is further given to the pixel indicating the cell nucleus region. Data in which a label value indicating "a nucleus region of the second layer structure" is added to the region of the cell nucleus in the fourth preliminary training data 71R2N are used as the fourth training data 73R2.

The fifth training image 70R3 included in the training image is an image acquired from a third layer structure (for example, a connective tissue layer) included in the tissue from which the first training image 70R1 is acquired. This image is obtained from a sample stained so that the tissue structure can be recognized by microscopic observation. Although the staining is not limited insofar as the tissue structure can be recognized, the staining is preferably a staining for bright field observation. The above-described bright field observation staining is not limited insofar as at least the cell nucleus and a part other than the cell nucleus can be stained so as to be distinguishable by hue. When the sample is a mammalian tissue sample, for example, HE staining can be mentioned.

The fifth training data 72R3*r*, 72R3*g*, 72R3*b*, and the fifth preliminary training data 70R3L are generated from the fifth training image 7R3. The fifth training data 72R3*r*, 72R3*g*, and 72R3*b* are information on a single color image obtained by separating the hues included in the fifth training image 70R3 for each primary color. The fifth preliminary training data 70R3L is binarized data (label value) indicating that the layer structure included in the fifth training image 70R3 is the third layer structure. The layer structure included in the fifth training image is determined to be the third layer structure, for example, by sample observation by an examiner or the like.

The sixth training image 71R3 included in the training image indicates where in the fifth training image 70R3 is the nucleus region of the cell, that is, this is an image showing the area of the structure in which the correct answer of "a nucleus region" is the third layer. This image is a captured image that is subjected to fluorescent nuclear staining to selectively stain the cell nucleus relative to a sample that is the same as the sample from which the fifth training image 70R3 is acquired, or a sample (for example, consecutively sliced sample) corresponding to the sample from which the fifth training image 70R3 was acquired. Although the fluorescent nucleus stain is not limited, it is preferable that the fluorescent nucleus stain is the same as the fluorescent nucleus stain performed on the sample at the time of acquiring the second training image 71R1. From the sixth training image 71R3, the sixth preliminary training data 71R3N is generated. The sixth preliminary training data 71R3N are binarized data generated by binarizing the sixth training image 71R3, and indicate either a region of the cell nucleus or another region.

The sixth preliminary training data 71R3N and the fifth preliminary training data 70R3L are associated with each pixel. In the sixth preliminary training data 71R3N, a label value indicating the nucleus region of the third layer structure is also given to the pixel indicating the cell nucleus region. Data in which a label value indicating "a nucleus region of the third layer structure" is added to the region of the cell nucleus in the sixth preliminary training data 71R3N, and are used as the sixth training data 73R3.

The training data include first layer structure training data 74R1, second layer structure training data 74R2, and third layer structure training data 74R3. When the tissue includes an additional layer structure, additional training data may be created according to the method of generating the fourth or sixth training data 73R3.

The nuclear region of the cell refers to a region containing one or more nuclei. Hereinafter, the region of the nucleus of the cell is also referred to as a "nuclear region".

A case in which the layer structure of the tissue contained in the captured image of the HE stained tissue sample is determined by a deep learning algorithm is described as an example in the summary and the embodiment of the invention.

Summary of Deep Learning Method and Image Analysis Method

First, the deep learning method is described.

Summary of Deep Learning Method

The outline of generation of the first layer structure training data 74R1 including the first training data 72R1r, 72R1g, 72R1b and the second training data 73R1 will be described with reference to FIG. 1. FIG. 1 shows an example of training data input to a neural network using a slide image 70W of a tissue sample. The slide image 70W shows a training image in which a sample prepared by applying HE staining as a bright field observation stain is imaged in a bright field. L1 shown in the slide image 70W shows the first layer structure. L2 represents the second layer structure. L3 represents a third layer structure. An area surrounded by a rectangular frame indicated by the symbol R1 in the slide image 70W indicates an area used as the first training image 70R1. An area surrounded by a rectangular frame indicated by a symbol R2 indicates an area used as the third training image 70R2 shown in FIG. 2. An area surrounded by a rectangular frame indicated by a symbol R3 indicates an area used as the fifth training image 70R3 shown in FIG. 3. The inclusion of the first training image 70R1 in the first layer structure, the inclusion of the third training image 70R2 in the second layer structure, and the inclusion of the fifth training image 70R3 in the third layer structure also may be determined before acquiring each training image or may be determined after each training image is acquired.

In FIG. 1, a plurality of hues are included in the first training image 70R1 since the first training image 70R1 captures HE-dyed samples as a color image under brightfield observation.

The first training image 70R1 can be acquired in advance using an image acquiring device such as a known optical microscope, fluorescent microscope, virtual slide scanner or the like, for example. Illustratively, in this embodiment it is preferable that color imaging acquired from the image acquiring device is a 24-bit color with RGB color space. For the 24-bit color of RGB, it is preferable to express the respective densities (color densities) of red, green and blue with gradation of 8 bits (256 steps). The first training image 70R1 may be an image including one or more primary colors. From the first training image 70R1, the first training data 72R1r, 72R1g, 72R1b and the first preliminary training data 70R1L are generated.

In the present invention, the hue is illustratively defined by a combination of the three primary colors of light or a combination of the three primary colors of the color. The first training data 72R1r, 72R1g, and 72R1b are generated corresponding to the first training image 70R1 and are data represented by codes corresponding to the density generated for each primary color by separating the hues appearing in the first training image 70R1 into individual primary colors. In FIG. 1, images (hereinafter, also referred to as "single color image") 72R1R, 72R1G, 72R1B represented by single color densities separated by each primary color of red (R), green (G), and blue (B) are obtained.

The color density of each color is encoded for each pixel on the single color images 72R1R, 72R1G, and 72R1B, and for the entirety of each image R, G, B, an encoded diagram (hereinafter also referred to as "color density encoded drawing") 72R1r, 72R1g, and 72R1b corresponding to the color density of each pixel is generated. The color density may be encoded with numerical values indicating 256 stages of each color. The color density also may be pre-processed for numerical values indicating 256 gradations of each color, and the color density of each pixel may be encoded with numbers indicated by eight levels from 0 to 7, for example. For the sake of convenience of explanation, the color density encoded diagrams 72R1r, 72R1g, and 72R1b generated from the single color image of each color of R, G, and B exemplarily shown in FIG. 1 are represented with the color density at each pixel coded in eight levels at values of 0 to 7. First training data 72R1r, 72R1g, 72R1b in which the color density values of R, G, B of each pixel are combined are generated from the color density encoded diagrams 72R1r, 72R1g, 72R1b shown in FIG. 1. Symbols indicating color densities are also referred to as color density values in this specification. Alternatively, as the first training data 72R1r, 72R1g, and 72R1b, a matrix of color density values corresponding to each pixel may be generated instead of the color density encoded diagram.

In FIG. 1, the first preliminary training data 70R1L are data indicating that the layer structure included in the first training image 70R1 is the first layer structure. The data may be image data or a label value corresponding to each pixel in the first training image 70R1. For example, since the entire area of the first training image 70R1 is the first layer structure, the same numerical value is assigned as the label value indicating that it is the first layer structure for all the pixels in the first training image 70R1.

In FIG. 1, the second training image 71R1 is obtained by imaging a fluorescent nucleus-stained sample under fluorescence observation by a fluorescence microscope at a gray scale of two or more gradations or by color imaging. The second training image 71R1 can be acquired in advance using an image acquisition device such as a known fluorescence microscope or a virtual slide scanner. From the second training image 71R1, the second preliminary training data 71R1N are generated.

The second preliminary training data 71R1N are generated by, for example, converting the second training image 71R1 of grayscale or color of two gradations or more as a monochrome fluorescence image by binarization processing. The region of the cell nucleus is discriminated by binarizing the second training image 71R1 and distinguishing the region of the cell nucleus from the other region. The determination of whether a region is a region of a cell nucleus or other region by binarization processing can be accomplished by comparing the color density value of each pixel in the image with a predetermined condition (for example, a color density threshold value). The threshold value can be set by, for example, a discriminant analysis method, a mode method, a Kittler method, a 3σ method, a p-tile method, or the like. Instead of comparing with the threshold value, gradation may be binarized using the maximum likelihood estimation method. The binarized data obtained by the binarization processing may be attached as a label value for each pixel in the second training image 71R1. For example, "1" is assigned to a pixel indicating the region of the cell nucleus, and "0" is assigned to the regions other than the region of the cell nucleus. The label value also may be indicated as a color on the second training image 71R1 (for example, the nucleus region is white and the region other than nucleus is black).

Next, the second training data 73R1 are generated. The second training data 73R1 are data generated from the first preliminary training data 70R1L and the second preliminary training data 71R1N, and are data to be learned as a correct answer by the neural network 50 as the true value image 73R1. Since the second training data 73R1 are generated from the first training image 70R1 including the first layer structure and the second training image 71R1, the correct answer indicating the layer structure of the tissue is the nuclear region of the first layer structure. The second training data 73R1 includes a label value indicating a nuclear region of the first layer structure corresponding to each pixel of the second training image 71R1 and a label value indicating the other region separately. For example, the label value indicating the nucleus region of the first layer structure is "1", and the label indicating the other region is "0". Although the second training data 73R1 are shown as an image for convenience of explanation in FIG. 1, when input to the neural network, each pixel is given a label value differentiating a nuclear region of the first layer structure and other regions.

In the deep learning method, the first training data 72R1*r*, 72R1*g*, 72R1*b* and the second training data 73R1 shown in FIG. 1 are used as the first layer structure training data 74R1. Specifically, the neural network 50 learns by having the first training data 72R1*r*, 72R1*g*, 72R1*b* as the input layer 50*a*, and the second training data 73R1 as the output layer 50*bn*. That is, the neural network 50 learns the relationship between the pair of the first training data 72R1*r*, 72R1*g*, 72R1*b* and the second training data 73R1.

Figure 2:
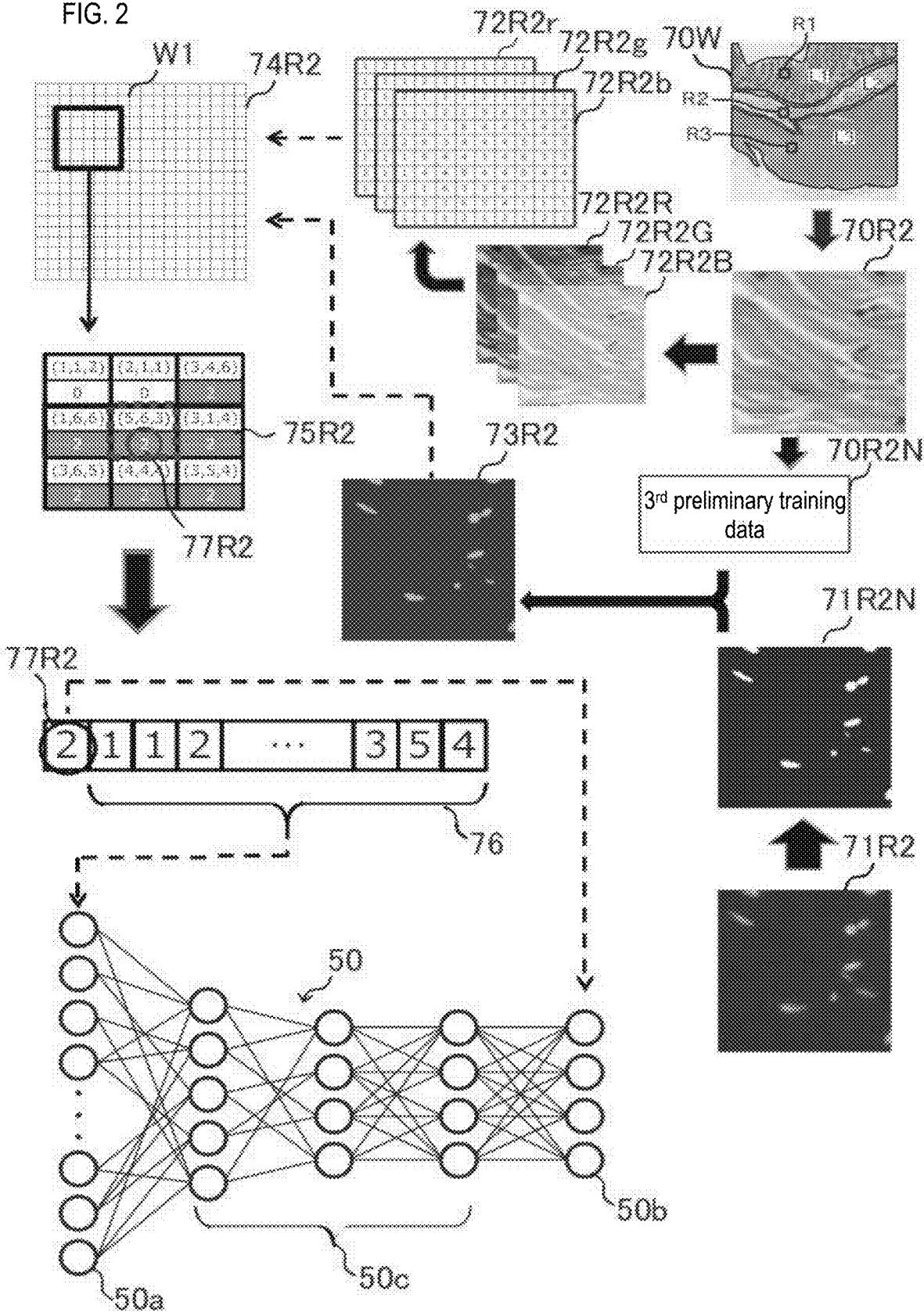
FIG. 2 is a schematic diagram illustrating an a summary of a deep learning method.

Referring to FIG. 2, an outline of the generation of the second layer structure training data 74R2 including the third training data 72R2*r*, 72R2*g*, 72R2*b* and the fourth training data 73R2 will be described next. In FIG. 2, since the slide image 70W is the same as FIG. 1, the third training image 70R2 includes a plurality of hues similar to the first training image 70R1.

The third training image 70R2 is obtained in the same manner as the first training image 70R1, except that the second layer structure is used instead of the first layer structure. Third training data 72R2*r*, 72R2*g*, 72R2*b* and third preliminary training data 70R2L are generated from the third training image 70R2.

The third training data 72R2*r*, 72R2*g*, and 72R2*b* are generated in the same manner as the first training data 72R1*r*, 72R1*g*, and 72R1*b*, except that the second layer structure is used instead of the first layer structure. Third training data 72R2*r*, 72R2*g*, 72R2*b* in which the color density values of R, G, B of each pixel are combined are generated from the color density encoded diagrams 72R2*r*, 72R2*g*, 72R2*b* shown in FIG. 2.

In FIG. 2, the third preliminary training data 70R2L are data indicating that the layer structure included in the third training image 70R2 is the second layer structure. The data may be image data or a label value corresponding to each pixel in the third training image 70R2. For example, since the entire area of the third training image 70R2 is the second layer structure, the same numerical value is assigned as the label value indicating that it is the second layer structure for all the pixels in the third training image 70R2. The label value indicating that it is the second layer structure is distinguished from the numerical value indicating the other layer structure.

In FIG. 2, the fourth training image 71R2 is acquired in the same manner as the second training image 71R1 except that the second layer structure is used instead of the first layer structure. From the fourth training image 71R2, the fourth preliminary training data 71R2N are generated. The fourth preliminary training data 71R2N are generated in the same manner as the second preliminary training data 71R1N, except that the second layer structure is used instead of the first layer structure.

Next, the fourth training data 73R2 are generated. The fourth training data 73R2 are data generated from the third preliminary training data 70R2L and the fourth preliminary training data 71R2N and are data to be learned as a correct answer in the neural network 50 as the true image 73R2. Since the fourth training data 73R2 are generated from the third training image 70R2 and the fourth training image 71R2 including the second layer structure, the correct answer that indicates the layer structure of the tissue is the nuclear region of the second layer structure. The fourth training data 73R2 includes a label value indicating a nucleus region of the second layer structure corresponding to each pixel of the fourth training image 71R2, and a label value indicating the other region separately. For example, the label value indicating the nucleus region of the second layer structure is "2", and the label value indicating the other region is "0". Although the fourth training data 73R2 shown in FIG. 2 are shown as an image for convenience of explanation, when input to the neural network, each pixel a label value differentiating a nucleus region of the second layer structure and other regions.

In the deep learning method, the third training data 72R2*r*, 72R2*g*, 72R2*b* and the fourth training data 73R2 shown in FIG. 2 are used as the second layer structure training data 74R2. Specifically, the neural network 50 learns by having the third training data 72R2*r*, 72R2*g*, and 72R2*b* set as the input layer 50*a* and the fourth training data 73R2 set as the output layer 50*b*. That is, the neural network 50 learns the pair relationship between the third training data 72R2*r*, 72R2*g*, 72R2*b* and the fourth training data 73R2.

Figure 3:
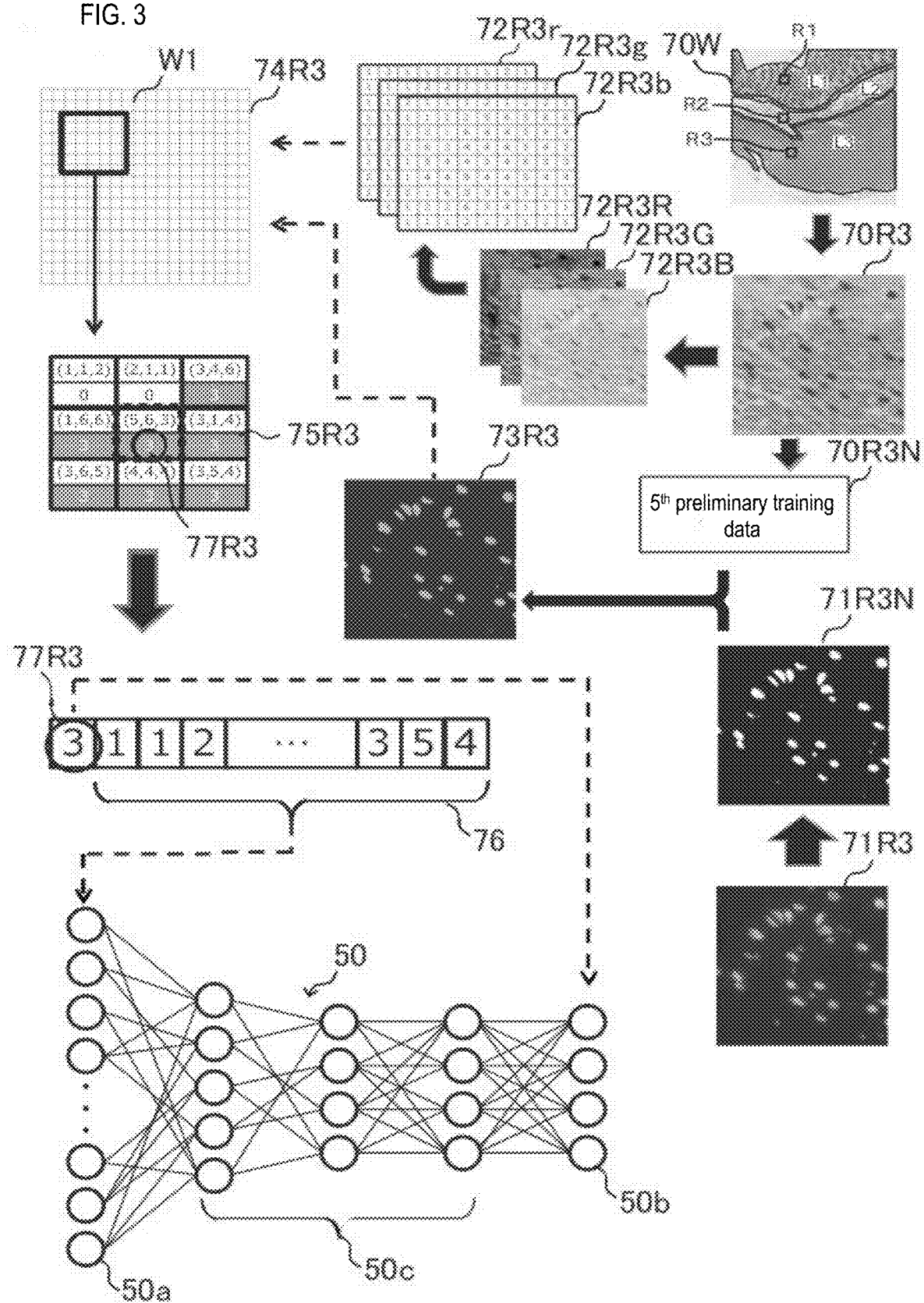
FIG. 3 is a schematic diagram illustrating a summary of a deep learning method.

Next, with reference to FIG. 3, an outline of the generation of the second layer structure training data 74R3 including the fifth training data 72R3*r*, 72R3*g*, 72R3*b* and the sixth training data 73R3 will be described. In FIG. 3, since the slide image 70W is similar to that of FIG. 1, the fifth training image 70R3 includes a plurality of hues similar to the first training image 70R1.

The fifth training image 70R3 is acquired in the same manner as the first training image 70R1, except that the third layer structure is used instead of the first layer structure. From the fifth training image 70R3, the fifth training data 72R3*r*, 72R3*g*, 72R3*b* and the fifth preliminary training data 70R3L are generated.

The fifth training data 72R3*r*, 72R3*g*, 72R3*b* are generated in the same manner as the first training data 72R1*r*, 72R1*g*, 72R1*b*, except that the third layer structure is used instead of the first layer structure. As the fifth training data 72R3*r*, 72R3*g*, 72R3*b* in which the color density values of R, G, B of each pixel are combined from the color density encoded diagrams 72R3*r*, 72R3*g*, 72R3*b* shown in FIG. 3.

In FIG. 3, the fifth preliminary training data 70R3L are data indicating that the layer structure included in the fifth training image 70R3 is the third layer structure. The data may be image data or a label value corresponding to each pixel in the fifth training image 70R3. For example, since the whole area of the fifth training image 70R3 is the third layer structure, the same numerical value is assigned as the label value indicating that it is the third layer structure for all the pixels in the fifth training image 70R3. The numerical value indicating the third layer structure is distinguished from the numerical value indicating the other layer structures.

In FIG. 3, the sixth training image 71R3 is acquired in the same manner as the second training image 71R1 except that the third layer structure is used instead of the first layer structure. From the sixth training image 71R3, the sixth preliminary training data 71R3N is generated.

The sixth preliminary training data 71R3N are generated in the same manner as the second preliminary training data 71R1N except that the third layer structure is used instead of the first layer structure.

Next, the sixth training data 73R3 are generated. The sixth training data 73R3 are data generated from the fifth preliminary training data 70R3L and the sixth preliminary training data 71R3N and are data to be learned as a correct answer by the neural network 50 as the true value image 73R3. Since the sixth training data 73R3 are generated from the fifth training image 70R3 and the sixth training image 71R3 including the third layer structure, correct answer indicating the layer structure of the tissue is the nuclear region of the third layer structure. The sixth training data 73R3 includes label values indicating the core region of the third layer structure corresponding to each pixel of the sixth training image 71R3 and the other regions distinguished from each other. For example, the label value indicating the nucleus region of the third layer structure is "3", and the label value indicating the other region is "0". Though the sixth training data 73R3 shown in FIG. 3 are shown as an image for convenience of explanation, when input to the neural network, each pixel is given a label value differentiating a nucleus region of the third layer structure and other regions.

In the deep learning method, the fifth training data 72R3*r*, 72R3*g*, 72R3*b* and the sixth training data 73R3 shown in FIG. 3 are used as the third layer structure training data 74R3. Specifically, the neural network 50 learns by having the fifth training data 72R3*r*, 72R3*g*, 72R3*b* as the input layer 50*a* and the sixth training data 73R3 as the output layer 50*b*. That is, the neural network 50 learns the relationship between the pair of the fifth training data 72R3*r*, 72R3*g*, 72R3*b* and the sixth training data 73R3.

A method of generating the first layer structure training data 74R1 will be described with reference to FIGS. 4A to 4C. The first layer structure training data 74R1 are a combination of the color density values of the color density encoded diagrams 72R1*r*, 72R1*g*, 72R1*b* of the first training data 72R1*r*, 72R1*g*, 72R1*b* and the second training data 73R1 for each pixel. In FIG. 4A, the image size (the size per training data) of the first layer structure training data 74R1 has been simplified for convenience of explanation, and the first training data 72R1*r*, 72R1*g*, 72R1*b* and the second training data 73R1 have a total of 81 pixels of 9 pixels in the vertical direction and 9 pixels in the horizontal direction.

FIG. 4B shows an example of a combination of color density values of 72R1*r*, 72R1*g*, and 72R1*b* in one pixel configuring the first layer structure training data 74R1 and label values indicating nucleus regions. Three values 74R1*a* shown in the upper part of FIG. 4B are color density values of R, G, and B in each pixel. Illustratively, the three values are stored in order of red (R), green (G) and blue (B) from the left. For the sake of convenience, the color density values of the pixels of the color density encoded diagrams 72R1*r*, 72R1*g*, and 72R1*b* are shown in 8 levels from the value 0 to the value 7. This is a process of converting the brightness of each color image 72R1R, 72R1G, 72R1B expressed in 256 levels when captured, as an example of image preprocessing to 8 color density values, respectively. For the color density value, for example, the lowest brightness (a gradation group having a low brightness value when expressed by 256 RGB colors) is set as the color density value 0, and gradually higher values are assigned as the degree of brightness increases, and the highest brightness (gradation group having high brightness value when expressed in RGB color 256 steps) is set as color density value 7. The value 74R1*b* shown in the lower part of FIG. 4B is the label value of the second training data 73R1 of the corresponding pixel. For example, the label value 1 indicates the cell nucleus of the first layer structure, and the label value 0 indicates the other region. That is, in the second training data 73R1 shown in FIGS. 1 and 4A, the position of the pixel the label value of which changes from 1 to 0 or the pixel which changes from 0 to 1 is located at the border of the nucleus region and the other region of the first layer structure.

The first layer structure training data 75R1 shown in FIGS. 1 and 4C are data of an extracted region (hereinafter referred to as "window size") of a predetermined number of pixels of the first layer structure training data 74R1 shown in FIG. 4A. Although the first layer structure training data 75R1 of the window size is simplified to 3×3 pixels for the sake of convenience of explanation, an actual preferable window size is illustratively about 113×113 pixels, and therein a size of 3×3 nucleus of normal gastric epithelial cells is preferable from the viewpoint of learning efficiency. For example, as shown in FIG. 3C, a window W1 of 3×3 pixels is set, and the window W1 is moved relative to the first layer structure training data 74R1. The center of the window W1 is located at any pixel of the first layer structure training data 74R1; for example, the first layer structure training data 74R1 in the window W1 indicated by the black frame is the first layer of the window size and is extracted as structure training data 75R1. The first layer structure training data 75R1 of the extracted window size are used for learning by the neural network 50 shown in FIG. 1.

As shown in FIG. 1, the number of nodes of the input layer 50a of the neural network 50 is the number of pixels of the first layered structure training data 75R1 of the input window size, and corresponds to the number and type of primary colors included in the image (for example, in the case of the three primary colors of light, three: R, G, B). The neural network 50 learns by having the color density value data 76 of each pixel of the first layer structure training data 75R1 of the window size set as the input layer 50a of the neural network, and the label value 77R1 of the pixel positioned at the center among the label values 74R1b corresponding to the second training data 73R1 of each pixel of the first layer structure training data 75R1 set as the output layer 50b of the neural network. The color density value data 76 of each pixel is aggregate data of the color density values 74R1a of each color of R, G, B of each pixel of the first layer structure training data 75R1. As an example, when the first layer structure training data 75R1 of the window size is 3×3 pixels, one color density value 74a is given for each of R, G and B for each pixel, such that the number of color density values of the color density value data 76 is "27" (3×3×3=27) and the number of nodes of the input layer 50a of the neural network 50 also becomes "27".

In this manner, the first layer structure training data 75R1 of the window size input to the neural network 50 can be automatically created by the computer without being created by the user. In this way efficient deep layer learning of the neural network 50 is promoted.

Figure 6:
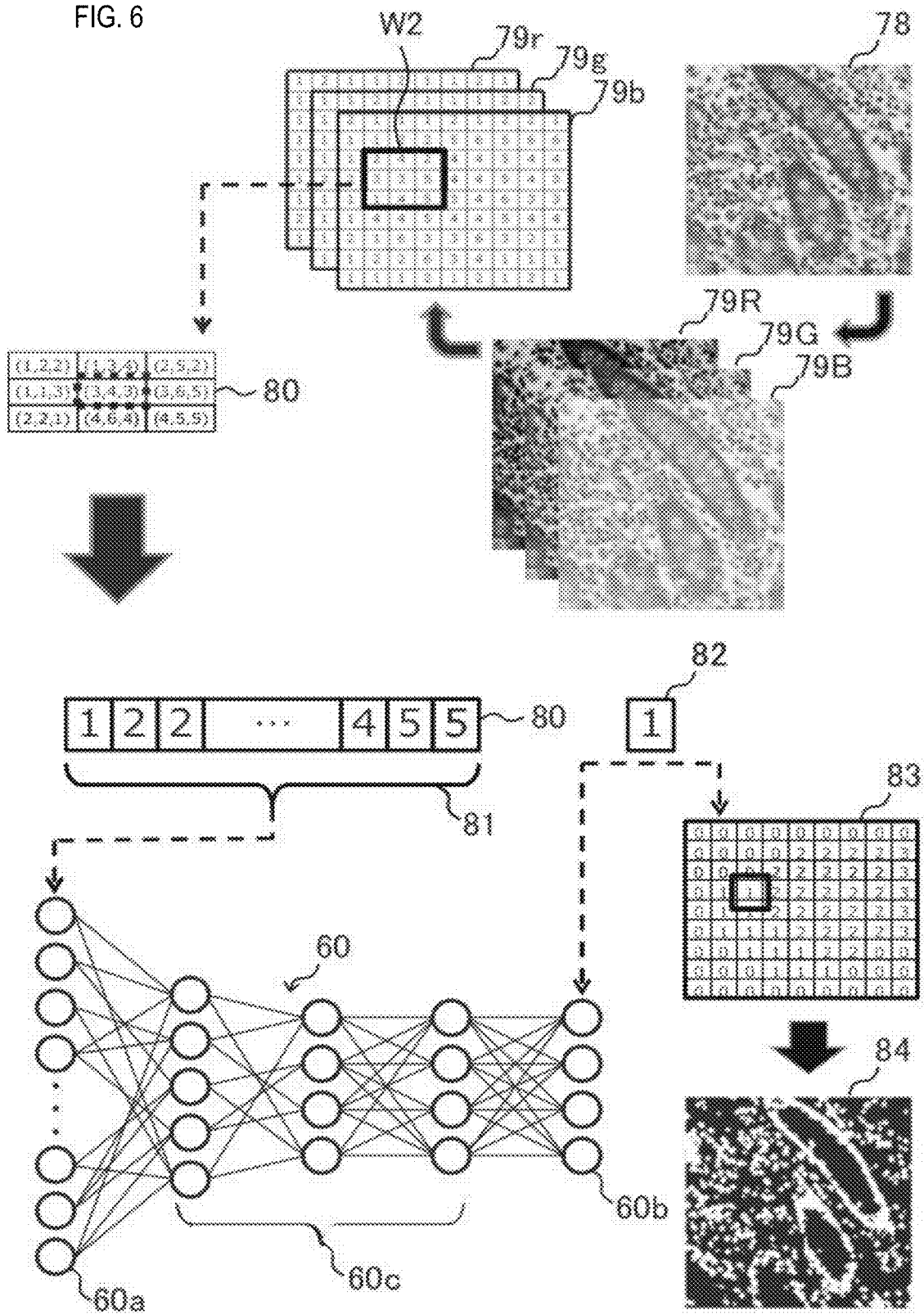
FIG. 6 is a schematic diagram illustrating the outline of an image analysis method.

As shown in FIG. 4C, in the initial state, the center of the window W1 is located at the upper left corner of the first layer structure training data 74R1. Thereafter, the first layer structure training data 75R1 of the window size is extracted by the window W1, and the position of the window W1 is moved each time learning of the neural network 50 is performed. Specifically, the window W1 is moved in units of one pixel so that the center of the window W1 scans, for example, all pixels of the first layer structure training data 74R1. In this way the first layer structure training data 75R1 of the window size extracted from all the pixels of the first layer structure training data 74R1 are used for learning of the neural network 50. Therefore, the degree of learning of the neural network 50 can be improved, and as a result of deep learning, a deep learning algorithm having the structure of the neural network 60 shown in FIG. 6 is obtained.

Figures 5A, 5B:
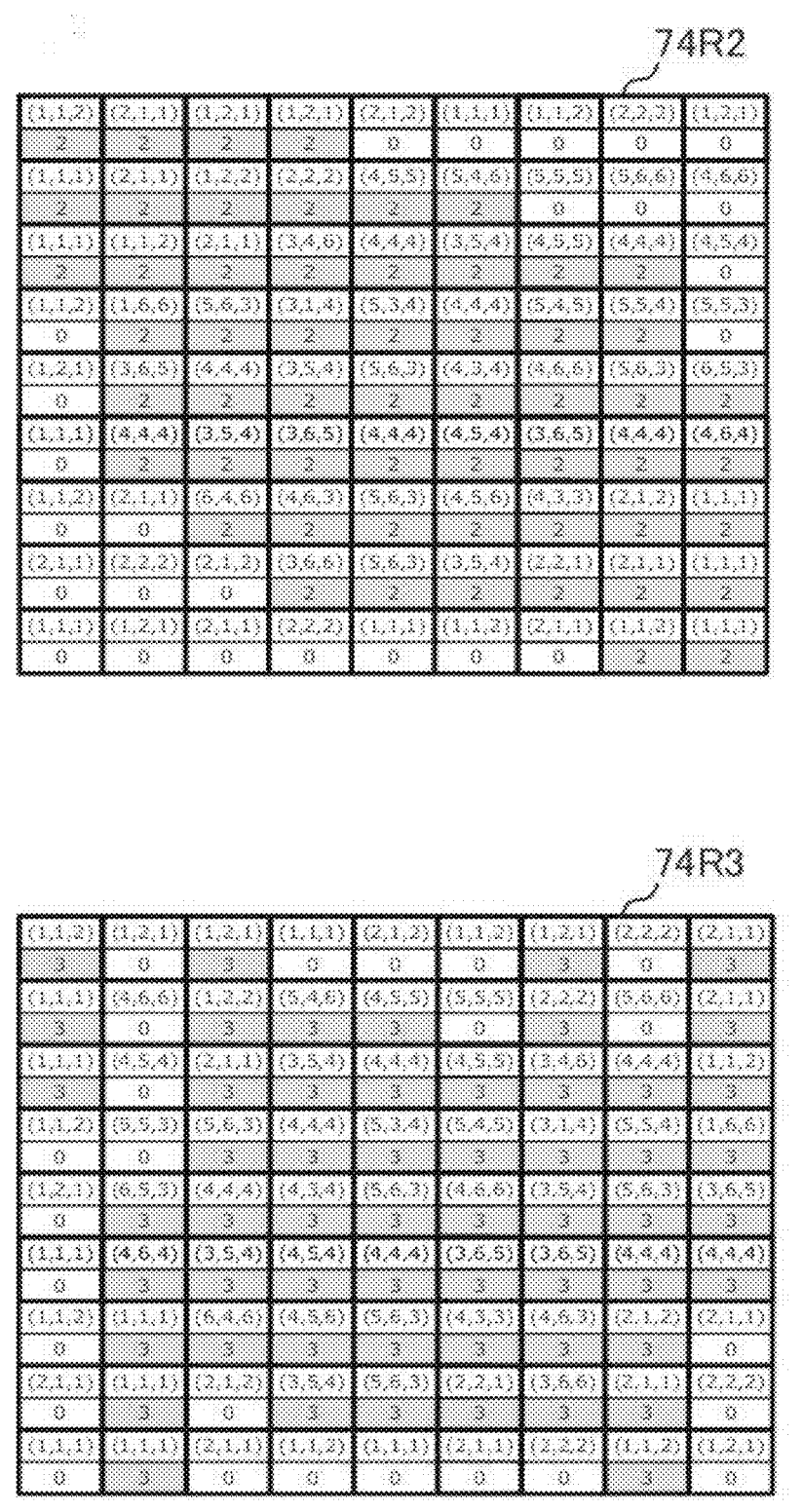

FIG. 5A shows the second layer structure training data 74R2. In the method of generating the second layer structure training data 74R2, instead of the first training data 72R1r, 72R1g, 72R1b and the second training data 73R1, the third training data 72R2r, 72R2g, 72R2b and the fourth training data 73R2 are used as the first layer structure training data 74R1. In FIG. 5A, in the second layer structure training data 74R2, for example, the label value 2 indicates the nucleus region of the cell of the second layer structure, and the label value 0 indicates the other region. That is, in the fourth training data 73R2 shown in FIG. 2, the position of the pixel whose label value changes from 2 to 0 or the pixel that changes from 0 to 2 corresponds to the border between the nucleus region of the second layer structure and the other region. The label value of the pixel positioned at the center among the label values corresponding to the fourth training data 73R2 of each pixel in the second layer structure training data 75R2 are the label value 77R2 input to the output layer 50b.

FIG. 5B shows the third layer structure training data 74R3. In a method of generating the third layer structure training data 74R3, instead of the first training data 72R1r, 72R1g, 72R1b and the second training data 73R1, the fifth training data 72R3r, 72R3g, 72R3b and the sixth training data 73R3 are used as the first layer structure training data 74R1. In FIG. 5B, in the third layer structure training data 74R3, for example, the label value 3 indicates the nucleus region of the cell of the third layer structure, and the label value 0 indicates the other region. That is, in the sixth training data 73R3 shown in FIG. 3, the position of the pixel whose label value changes from 3 to 0 or the pixel changing from 0 to 3 corresponds to the border between the nucleus region of the fourth layer structure and the other region. The label value of the pixel positioned at the center among the label values corresponding to the sixth training data 73R3 of each pixel in the third layer structure training data 75R3 is the label value 77R3 input to the output layer 50b.

The first layered structure training data 75R1, the second layered structure training data 75R2, and the third layered structure training data 75R3 together have a label indicating a nucleus region of the first layer structure of 1, a label indicating the nucleus region of the second layer structure of 2, a label indicating the nucleus region of the third layer structure of 3, a label indicating a part not corresponding to either the nucleus region of the second layer structure or the nucleus region of the third layer structure is 4-value data of 0, and is learned by the neural network 50 as a true value.

For the training image of the window size used for learning, it is preferable to use, for example, one obtained by dividing a hole slide image taken at a magnification of 20 to 60 times divided into 300 to 600. The enlargement magnification of the hole slide image can be selected from 20 times, 40 times, 60 times. Preferably, it is 40 times magnification. The division of the hole slide image can be selected from about 300 division, 350 division, 400 division, 450 division, 500 division, 550 division, and 600 division. It is possible to use a training image obtained by dividing a whole slide image taken at an enlargement magnification of preferably 40 times, into 512. The number of training images is not limited, but it is preferable to use at least 10, at least 30, at least 50 images for each layer structure. The window size can be selected from the range of 25±30 μm×25±30 μm. Preferably in the range of 25±20 μm×25±20 μm, more preferably in the range of 25±20 μm×25±20 μm, further preferably in the range of 25±10 μm×25±10 μm. And most preferably in the range of 25±5 μm×25±5 μm.

Image Analysis Method Summary

In the image analysis method shown in FIG. 6, analysis data 80 are generated from an analysis target image (bright field image) 78 obtained by imaging a sample including a tissue or cells to be analyzed. It is preferable that the sample is stained the same as the first training image 70R1. The analysis target image 78 can also be acquired as a color image, for example, using a known microscope, a virtual slide scanner, or the like, for example. The image to be analyzed (bright field image) 78 may be an image including one or more primary colors. When color analysis target image 78 is encoded with color density values of each color of R, G, and B for each pixel, it is possible to represent the entire image as an encoded diagram of color density values in each pixel for each of R, G, B (analysis color density encoded diagrams 79r, 79g, 79b). Analysis target data in which the color density values of R, G, B are combined for each pixel are generated from the color density encoded diagrams 79r, 79g, 79b. Color density encoded diagrams 79r, 79g, and 79b indicating the codes of the color densities in the single color image of each color of R, G, and B shown in the example of FIG. 5 are obtained by substituting the three primary colors of images 79R, 79G, 79B with color density values represented by codes displayed in eight levels from 0 to 7.

The analysis data 80 are data obtained by extracting an area (that is, window size) of a predetermined number of pixels of analysis target data, and are data including color density values of tissues or cells included in the analysis target image 78. Similar to the first layer structure training data 75R1, the second layer structure training data 75R2, and the third layer structure training data 75R3, the window size analysis data 80 are also stored in 3×3 pixels Although shown in a simplified manner, the actual preferable window size is illustratively about 113×113 pixels, and the size that normal nucleus of normal gastric epithelial cells can enter is about 3×3, and from the viewpoint of discrimination accuracy, for example, it is about 113×113 pixels with a visual field of 40 times. For example, the window W2 of 3×3 pixels is set, and the window W2 is moved relative to the data to be analyzed. The center of the window W2 is located at any pixel of the data to be analyzed, and if the color density encoded diagrams 79r, 79g, and 79b are extracted by a window W2 indicated by a black frame of 3×3 pixels, for example, to obtain analysis data 80. In this manner, the analysis data 80 is generated for each region including peripheral pixels around the predetermined pixel from the analysis target data. The predetermined pixel means a pixel of the analysis object data located at the center of the window W2 and the peripheral pixel means a pixel of the analysis target data which is included within the window size range centered on the predetermined pixel. Similar to the first layer structure training data 75R1, the second layer structure training data 75R2, and the third layer structure training data 75R3, the color density values are red (R), green (G) and blue (B) in this order also the analysis data 80.

In the image analysis method, a neural network learns by using the first layer structure training data 75R1, the second layer structure training data 75R2, and the third layer structure training data 75R3 having the window sizes shown in FIGS. 1 to 3, and processes analysis data 80 using the deep layer learning algorithm 60. By processing the analysis data 80, data 83 indicating the layer structure in the tissue to be analyzed are generated.

Referring again to FIG. 6, the analysis data 80 extracted from the analysis target data are input to the neural network 60 configuring the deep learning algorithm. The number of nodes of the input layer 60a of the neural network 60 corresponds to the product of the number of input pixels and the number of primary colors included in the image. When the color density value data 81 of each pixel of the analysis data 80 are input to the neural network 60, the estimated value 82 (4 values) of the pixel positioned at the center of the analysis data 80 are output from the output layer 60b. For example, when the estimated value is 1, it indicates that it is a nucleus region of the first layer structure, when the estimated value is 2, it indicates that it is the nucleus region of the second layer structure, when the estimated value is 3, it indicates that it is a nucleus region of the third layer structure, and when the estimated value is 0, it indicates that it is a region other than the cell nucleus. That is, the estimated value 82 output from the output layer 60b of the neural network 60 is a label value generated for each pixel of the analysis target image, and is a datum indicating the layer structure in the analysis target image. The estimated value 82 is also referred to as a class in the description of the neural network as described later. The neural network 60 generates a label value indicating a layer structure relative to a pixel located at the center of the analysis data 80 relative to the input analysis data 80. In other words, the neural network 60 classifies the analysis data 80 into classes indicating the layer structure of the tissue included in the analysis target image. Here, the color density value data 81 of each pixel is aggregate data of color density values of each color of R, G, B of each pixel of the analysis data 80.

Thereafter, the analyzing data 80 is extracted at the window size while moving the window W2 by one pixel unit so that the center of the window W2 scans all the pixels of the analysis target data. The extracted analysis data 80 are input to the neural network 60. In this way the label value 83 is obtained as data indicating the layer structure of the tissue or cell in the analysis target image. In the example shown in FIG. 6, the nucleus region detection process of each layer structure is further performed on the label value 83, thereby obtaining a layer structure nucleus region weighted image 84 indicating the nucleus region of each layer structure. Specifically, the layer structure nucleus region detection process is processing for detecting a pixel indicating the nucleus region of each layer structure according to, for example, the estimated value 82, such that, in fact, a pixel having the estimated value 82 of 1 is deemed a nucleus region of the first layer structure, a pixel of the estimated value 82 of 2 is deemed a nucleus region of the second layer structure, and a pixel of the estimated value 82 of 3 is deemed a nucleus region of the third layer structure. The layer structure nucleus region weighted image 84 is an image in which the label value 83 is expressed in a color corresponding to the label value. After discriminating the nucleus region of the first layer structure, a process of causing a display device to display the nucleus region of the first layer structure and the other region (that is, a region other than the second layer structure and/or the third layer structure nucleus region or the non-nucleus region) also may be performed. For example, processing is performed such as drawing a line between the nucleus region of the first layer structure and other regions, filling the nucleus region of the first layer structure with color, so that these can be distinguished on the display device. Also, with respect to the second layer structure nucleus region and/or the third layer structure nucleus region, it is also possible to perform a process to display the nucleus region of the layer structure of the region of interest (the region to be analyzed) and the other regions so as to be distinguishable from each other.

First Embodiment

In the first embodiment, the configuration of a system that implements the deep learning method and image analysis method described in the above outline will be specifically described.

Structure Summary

Figure 7:
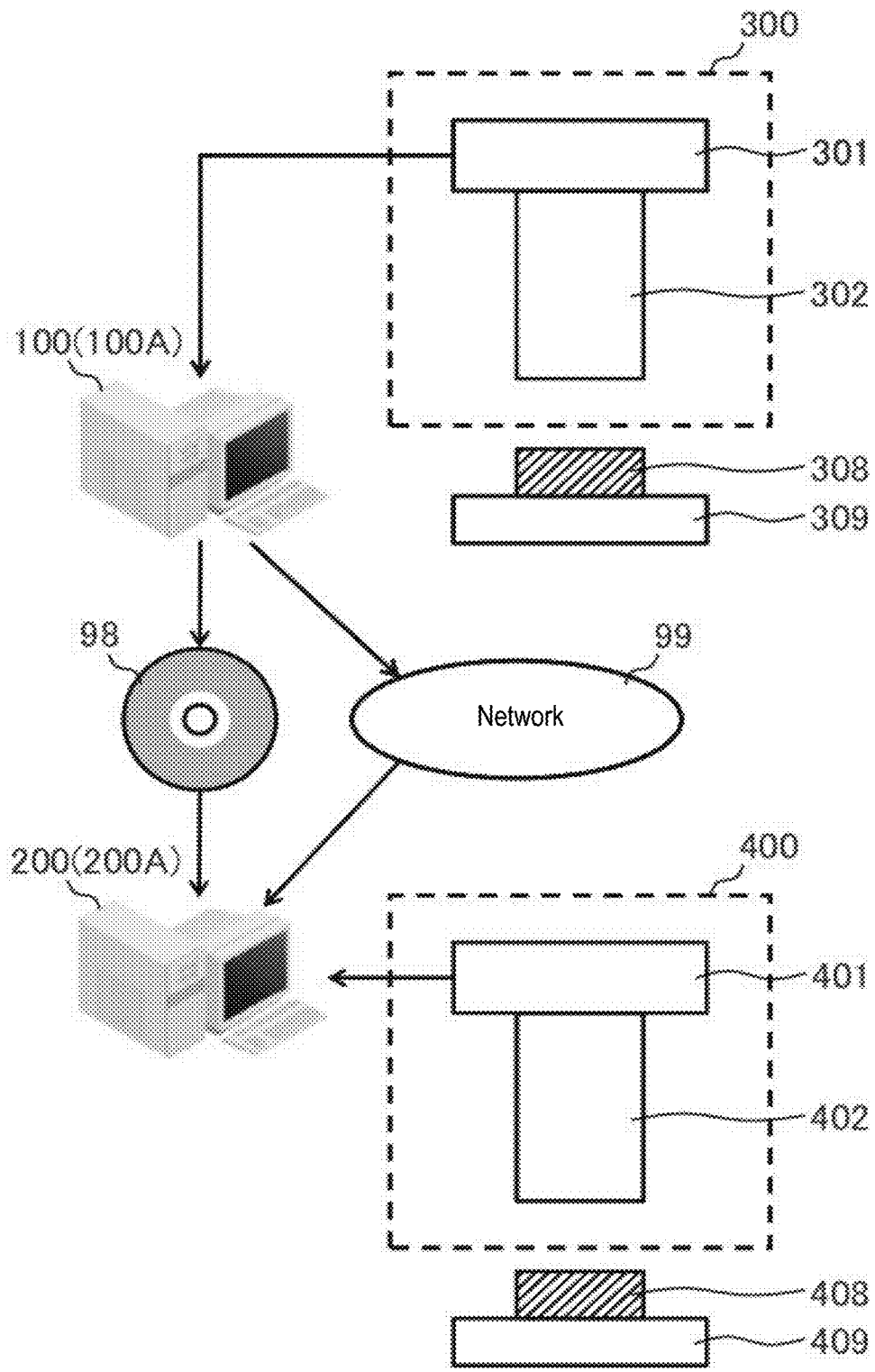
FIG. 7 is a schematic structural diagram of an image analysis system according to a first embodiment.

Referring to FIG. 7, the image analysis system according to the first embodiment includes a deep learning apparatus 100A and an image analysis apparatus 200A. The vendor side apparatus 100 operates as the deep layer learning apparatus 100A and the user side apparatus 200 operates as the image analysis apparatus 200A. The deep learning apparatus 100A learns using the training data in the neural network 50 and provides the user with a deep learning algorithm 60 that is trained with the training data. The deep learning algorithm configured by the learned neural network 60 is provided from the deep learning apparatus 100A to the image analysis apparatus 200A through a recording medium 98 or a network 99. The image analysis apparatus 200A analyzes an analysis target image using a deep learning algorithm configured by the learned neural network 60.

The deep layer learning apparatus 100A is configured by, for example, a general-purpose computer, and performs a deep learning process based on a flowchart to be described later. The image analysis apparatus 200A is configured by, for example, a general-purpose computer, and performs image analysis processing based on a flowchart to be described later. The recording medium 98 is a computer readable non-transitory tangible recording medium such as a DVD-ROM or a USB memory.

The deep learning apparatus 100A is connected to an imaging device 300. The imaging device 300 includes an imaging element 301 and a fluorescence microscope 302, and captures bright field images and fluorescence images of a learning sample 308 set on a stage 309. The learning sample 308 is subjected to the staining described above. The deep learning apparatus 100A acquires the training image captured by the imaging device 300.

The image analysis apparatus 200A is connected to the imaging device 400. The imaging device 400 includes an imaging element 401 and a fluorescence microscope 402, and captures a bright field image of an analysis target sample 408 set on the stage 409. The analysis target sample 408 is stained in advance as described above. The image analysis apparatus 200A acquires the analysis target image 78 captured by the imaging device 400.

A known fluorescence microscope, a virtual slide scanner or the like having a function of imaging a sample can be used as the imaging devices 300 and 400. The imaging device 400 also may be an optical microscope insofar as it has a function of imaging a sample.

Hardware Structure

Figure 8:
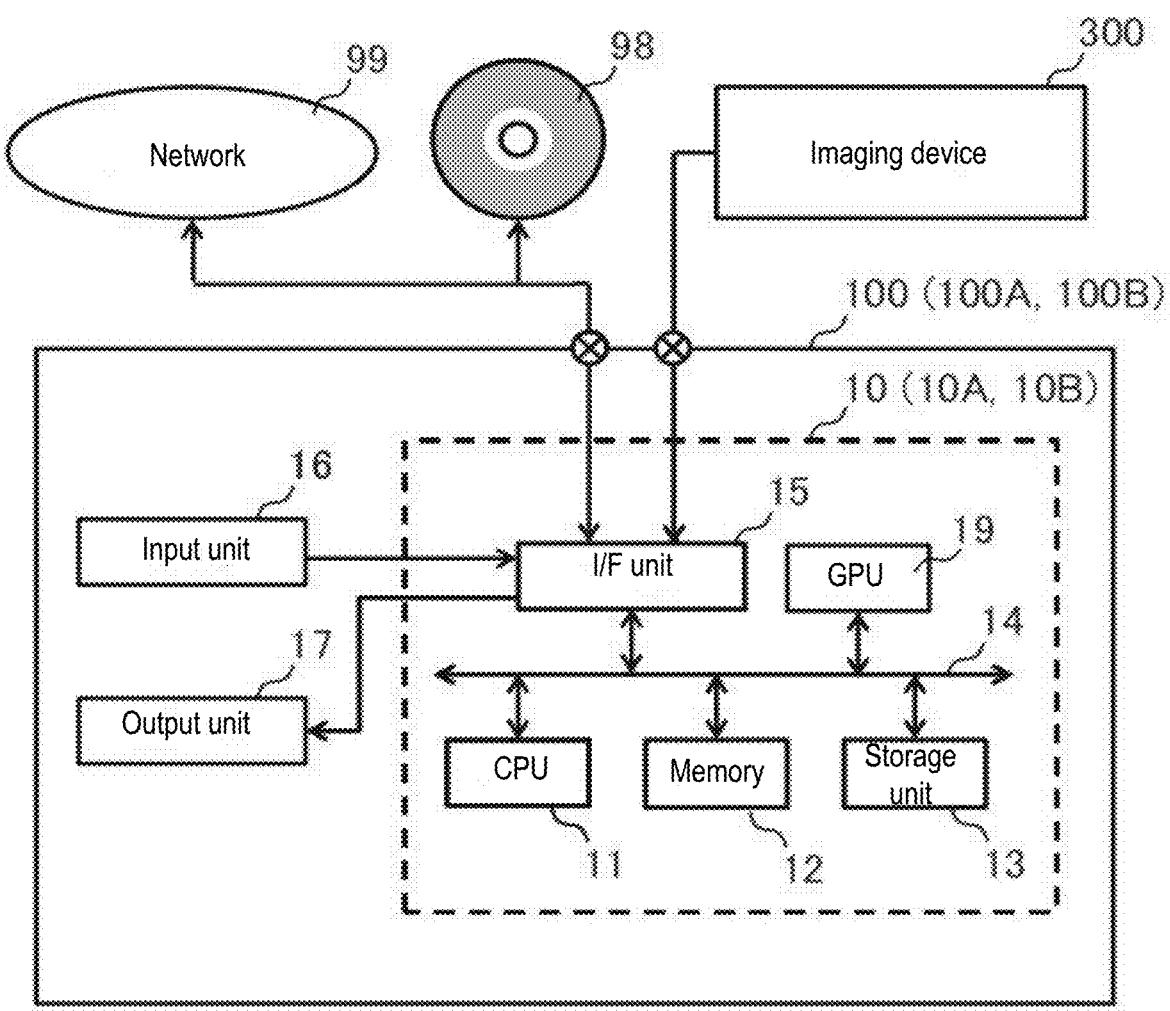
FIG. 8 is a block diagram showing a hardware configuration of a vendor-side apparatus 100.

Referring to FIG. 8, the vendor side apparatus 100 (100A, 100B) includes processing units 10 (10A, 10B), an input unit 16, and an output unit 17.

The processing unit 10 includes a CPU (Central Processing Unit) 11 that performs data processing to be described later, a memory 12 used as a work area for data processing, a storage unit 13 that records programs and processing data described later, a bus 14 for transmitting data, an interface unit 15 for inputting and outputting data with an external device, and a GPU (Graphics Processing Unit) 19. The input unit 16 and the output unit 17 are connected to the processing unit 10. Illustratively, the input unit 16 is an input device such as a keyboard or a mouse, and the output unit 17 is a display device such as a liquid crystal display. The GPU 19 functions as an accelerator for assisting arithmetic processing (for example, parallel arithmetic processing) performed by the CPU 11. That is, the process performed by the CPU 11 in the following description means that the process includes a process performed by the CPU 11 using the GPU 19 as an accelerator.

In order to perform the process of each step described below with reference to FIG. 10, the processing unit 10 pre-records the program and the neural network 50 of the present invention in the storage unit 13 before learning, for example, in an executable form. The execution form is, for example, a form generated by being converted from a programming language by a compiler. The processing unit 10 performs processing using the program recorded in the storage unit 13 and the neural network 50 before learning.

Unless otherwise specified in the following description, processing performed by the processing unit 10 means processing performed by the CPU 11 based on the program stored in the storage unit 13 or the memory 12 and the neural network 50. The CPU 11 temporarily stores necessary data (such as intermediate data being processed) with the memory 12 as a work area, and appropriately records data for long term storage, such as calculation results, in the storage unit 13.

Figure 9:
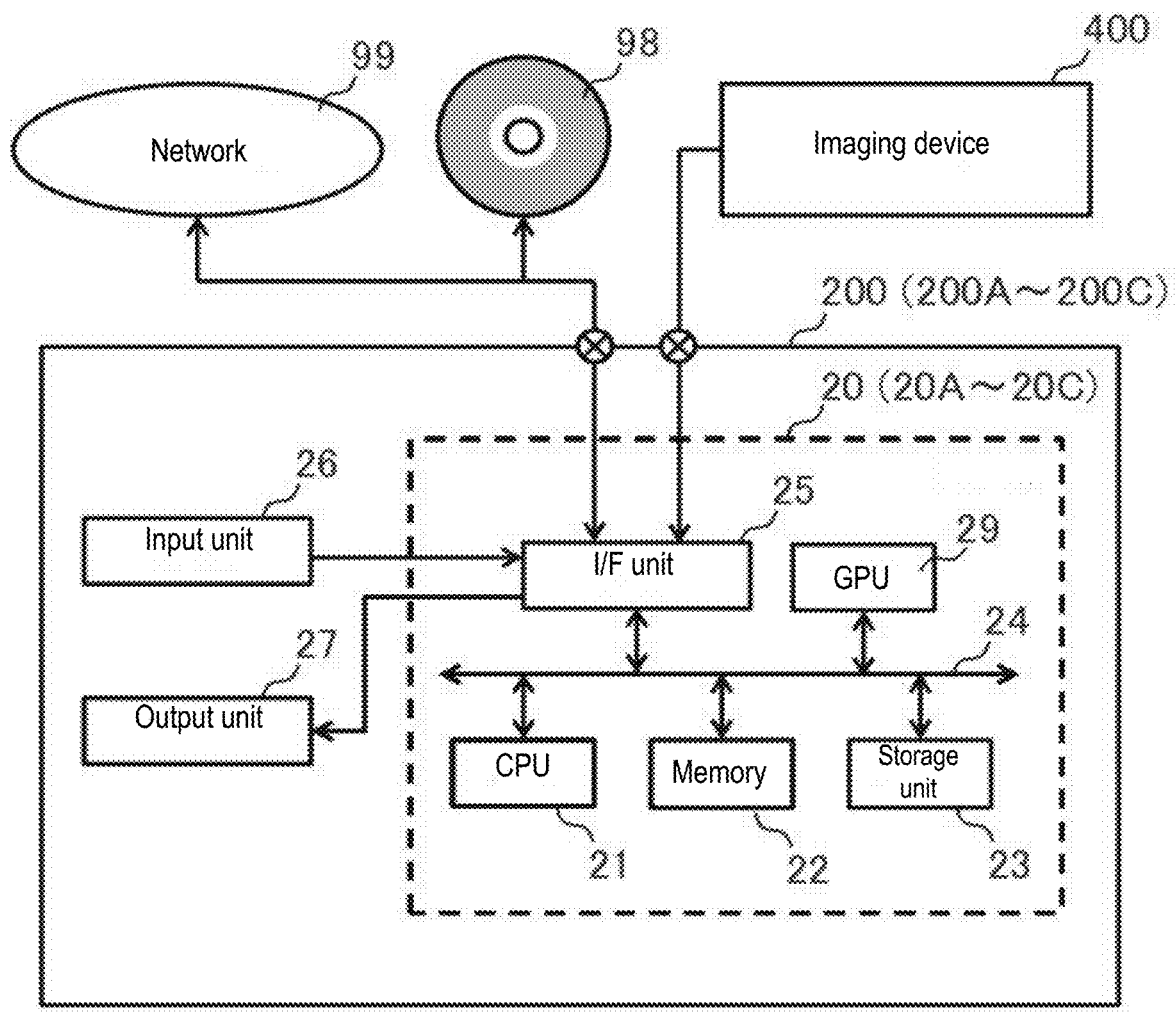
FIG. 9 is a block diagram showing a hardware configuration of a user side apparatus 200.

Referring to FIG. 9, the user side apparatus 200 (200A, 200B, 200C) includes a processing unit 20 (20A, 20B, 20C), an input unit 26, and an output unit 27.

The processing unit 20 includes a CPU (Central Processing Unit) 211 that performs data processing to be described later, a memory 22 used as a work area for data processing, a storage unit 23 that records programs and processing data described later, a bus 24 for transmitting data, an interface unit 25 for inputting and outputting data with an external device, and a GPU (Graphics Processing Unit) 29. The input unit 26 and the output unit 27 are connected to the processing unit 20. Illustratively, the input unit 26 is an input device such as a keyboard or a mouse, and the output unit 27 is a display device such as a liquid crystal display. The GPU 29 functions as an accelerator for assisting arithmetic processing (for example, parallel arithmetic processing) performed by the CPU 21. That is, the process performed by the CPU 21 in the following description means that the process includes a process performed by the CPU 21 using the GPU 29 as an accelerator.

In order to perform the processing of each step described below with reference to FIG. 14, the processing unit 20 records in advance the program according to the present invention and the learned neural network structure deep layer learning algorithm 60, for example, in an executable format in the storage unit 23. The execution form is, for example, a form generated by being converted from a programming language by a compiler. The processing unit 20 performs processing using the program recorded in the storage unit 23 and the deep learning algorithm 60.

Unless otherwise stated in the following description, the processing performed by the processing unit 20 means the processing actually performed by the processing unit 20 based on the program stored in the storage unit 23 or the memory 22 and the deep learning algorithm 60. The CPU 21 temporarily stores necessary data (such as intermediate data being processed) with the memory 22 as a work area, and stores data to be stored for a long term, such as calculation results and the like in the storage unit 23.

Function Block and Processing Procedure

Deep Learning Process

Figure 10:
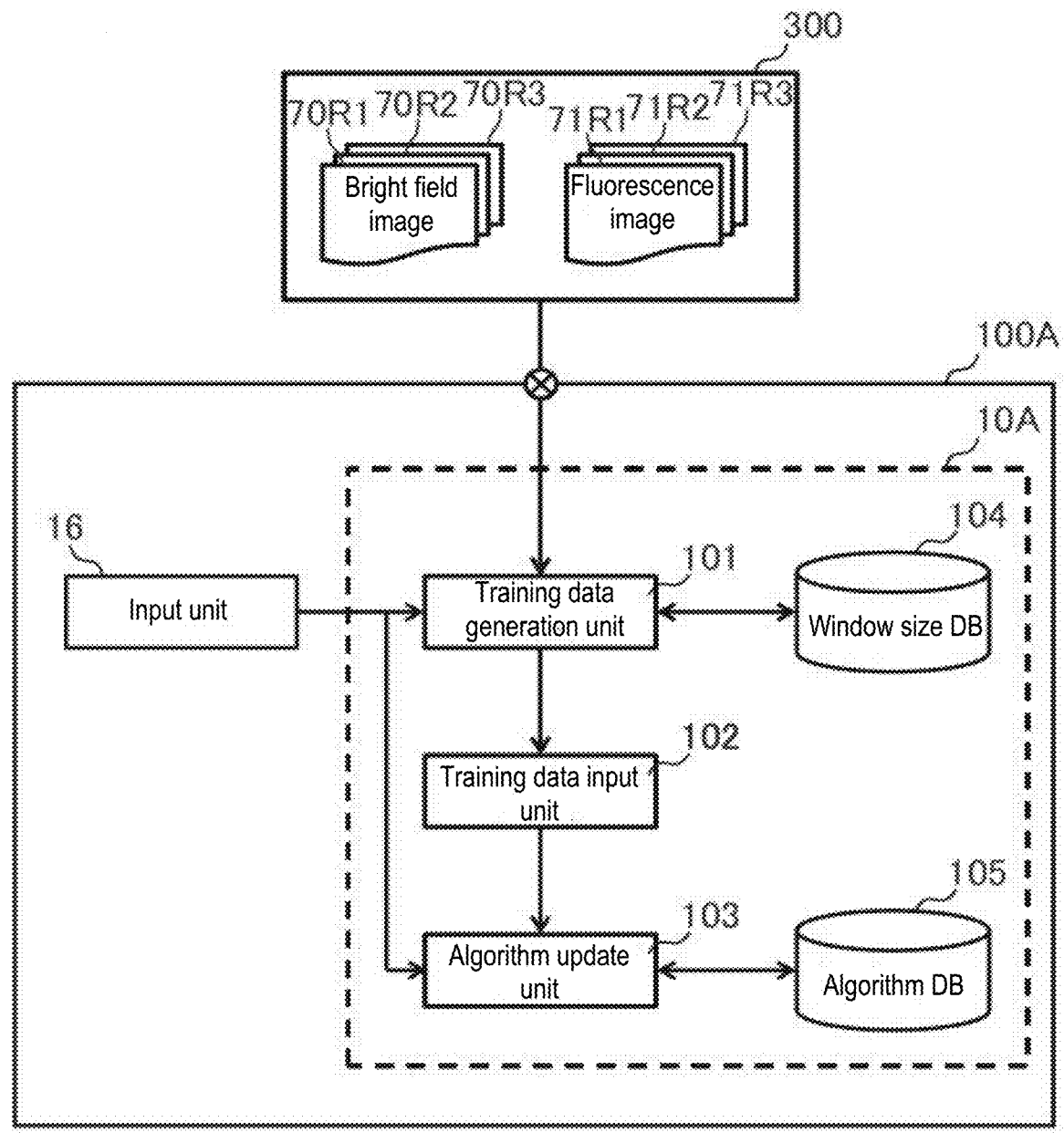
FIG. 10 is a block diagram illustrating the functions of the deep learning apparatus 100A according to the first embodiment.

Referring to FIG. 10, the processing unit 10A of the deep learning apparatus 100A according to the first embodiment includes a training data generating unit 101, a training data input unit 102, and an algorithm updating unit 103. These functional blocks are realized by installing a program that causes a computer to execute a deep layer learning process in the storage unit 13 or the memory 12 of the processing unit 10A and executing this program by the CPU 11. The window size database 104 and the algorithm database 105 are recorded in the storage unit 13 or the memory 12 of the processing unit 10A.

A first training image 70R1, a second training image 71R1, a third training image 70R2, a fourth training image 71R2, a fifth training image 70R3, and a sixth training image for learning samples are captured in advance by the imaging device 300 and stored in the storage unit 13 of the processing unit 10A or the memory 12 in advance. The neural network 50 is stored in advance in the algorithm database 105 in association with, for example, the type (for example, tissue name) of the tissue from which the sample to be analyzed is derived.

Figure 11:
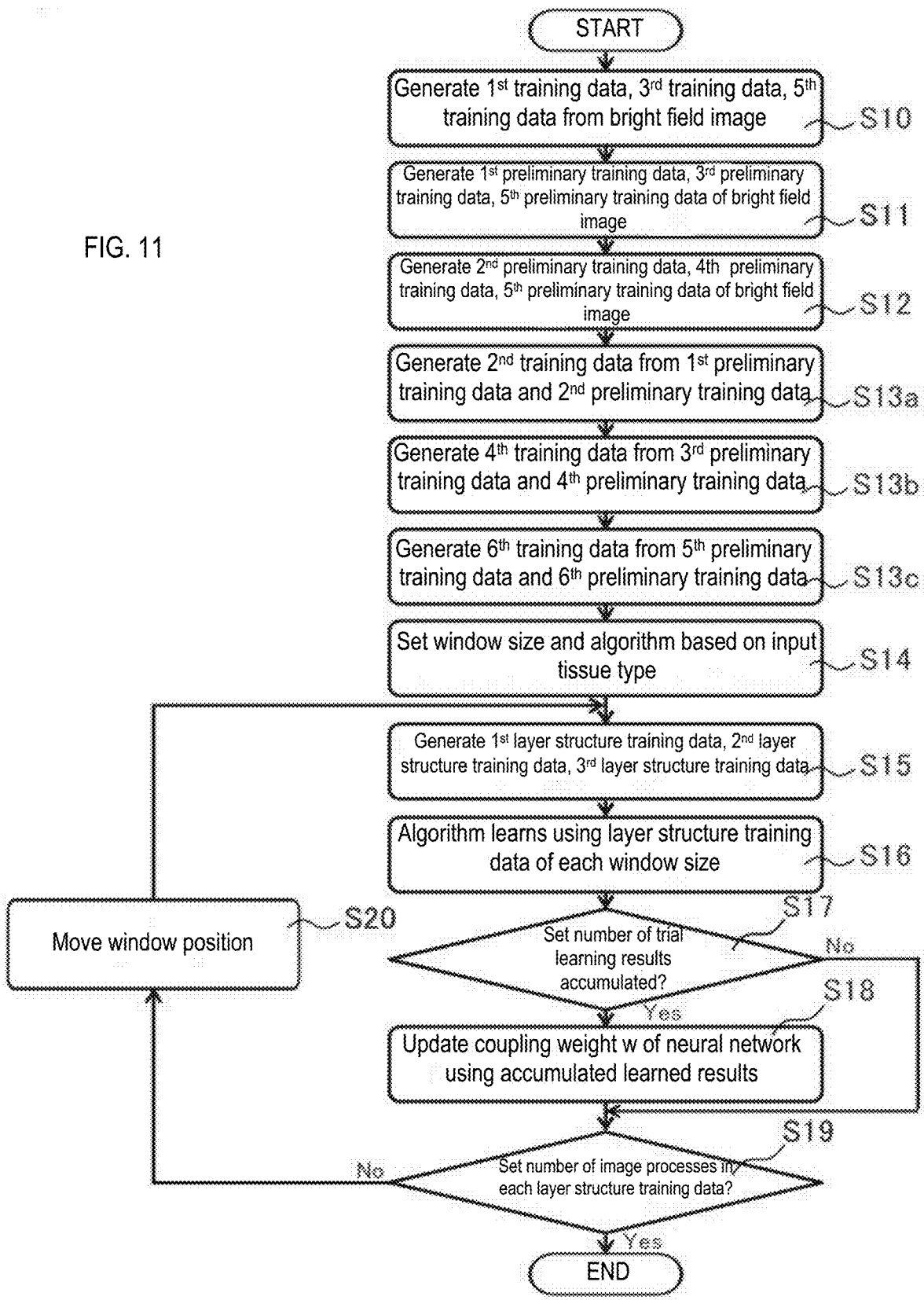
FIG. 11 is a flowchart showing a procedure of a deep learning process.

The processing unit 10A of the deep learning apparatus 100A performs the process shown in FIG. 11. When describing each function block shown in FIG. 10, the processes of steps S10 to S14, S19 and S20 are performed by the training data generating unit 101. The process of step S15 is performed by the training data input unit 102. The processes of steps S16 to S18 are performed by the algorithm updating unit 103.

In steps S10 to S20 described below, one pair of the first training image 70R1 and the second training image 71R1, one pair of the third training image 70R2 and the fourth training image 71R2, and a pair of the fifth training image 70R3 and the sixth training image 71R3 will be described.

In accordance with the method described in the outline of the deep learning method, the processing unit 10A executes a deep learning process to generate the first layer structure training data 74R1, the second layer structure training data 74R2, and the third layer structure training data 74R3. The processing unit 10A displays an image (a slide image 70W) of a wide area including the area of the first training image 70R1 on the output unit 17 by operation from the input unit 16 of the examiner, for example. The examiner who makes the determination visually confirms the image of the slide image 70W displayed on the output unit 17. The examiner specifies the area in the slide image 70W determined to include the first layer structure, for example, via the input unit 16, and surrounds the slide image 70W with a solid line in a color such as red, for example. For the second layer structure and the third layer structure as well, the examiner similarly encloses the area in the slide image 70W with solid lines in colors such as blue and green which are different from red. Instead of the examiner determining the slide image 70W by displaying the slide image 70W on the output unit 17, the processing unit 10A acquires the determined slide image 70W via the I/F unit 15, for example, via the network 99.

The processing unit 10A extracts the first training image 70R1 acquired from the area enclosed by the red solid line in the slide image 70W as designated by the examiner via the input unit 16 so as to include a predetermined number of pixels. Similarly, each of the third training image 70R2 and the fifth training image 70R3 is also extracted from the portions determined as the second layer structure and the third layer structure so as to include a predetermined number of pixels.

In step S10, the processing unit 10A generates color density encoded diagrams 72R1$r$, 72R1$g$, and 72R1$b$ of R, G, B colors as the first training data 72R1$r$, 72R1$g$, 72R1$b$ from the extracted first training image 70R1. The color density encoded diagrams 72R1$r$, 72R1$g$, and 72R1$b$ are generated by assigning to each pixel a code stepwise representing the color density values of each color of R, G, B of each pixel of the first training image 70R1. In the present embodiment, the color density values are expressed by 256 gradations from value 0 to value 255 to generate color density encoded diagrams 72R1$r$, 72R1$g$, and 72R1$b$ for respective R, G, B gradation images. Assignment of a color density value is carried out, for example, by setting the lowest brightness as the color density value 0, gradually assigning a higher value as the degree of brightness increases, and setting the highest brightness as the color density value 255. Similarly, third training data 72R2$r$, 72R2$g$, 72R2$b$ and fifth training data 72R3$r$, 72R3$g$, 72R3$b$ are generated from each of the third training image 70R2 and the fifth training image 70R3.

In step S11, the processing unit 10A generates the first preliminary training data 70R1L, the third preliminary training data 70R2L, and the fifth preliminary training data 70R3L indicating the first layer structure, the second layer structure, and the third layer structure of the first training image 70R1, the third training image 70R2, and the fifth training image 70R3.

Specifically, for example, a value "1" is assigned to each pixel of the first training image 70R1 as a label value indicating that the first layer structure is the first layer structure to obtain first preliminary training data 70R1L. For example, a value "2" is assigned to each pixel of the third training image 70R2 as a label value indicating that it is the second layer structure to be the third preliminary training data 70R2L. For example, a value "3" is assigned to each pixel of the third training image 70R3 as a label value indicating that it is the third layer structure to be the third preliminary training data 70R3L.

In step S12, the processing unit 10A specifies each pixel of the second training image 71R1 extracted from the fluorescence nucleus stained image for the portion corresponding to the first training image 70R1, and generates second preliminary training data 71R1N indicating the nuclear region of the tissue to be learned. The processing unit 10A binarizes the gradation of each pixel of the fourth training image 71R2 extracted from the fluorescent nucleus staining image relative to the portion corresponding to the third training image 70R2 as stipulated by the examiner from the input unit 16, and generates fourth preliminary training data 71R2N indicating the nuclear region of the tissue to be learned. The processing unit 10A binarizes the gradation of each pixel of the sixth training image 71R3 extracted from the fluorescent nucleus staining image relative to the portion corresponding to the fifth training image 70R3 as stipulated by the examiner from the input unit 16, and generates sixth preliminary training data 71R3N indicating the nuclear region of the tissue to be learned.

In step S13$a$, the processing unit 10A generates the second training data 73R1 from the first preliminary training data 70R1L and the second preliminary training data 71R1N.

In step S13$b$, the processing unit 10A generates the fourth training data 73R2 from the third preliminary training data 70R2L and the fourth preliminary training data 71R2N.

In step S13$c$, the processing unit 10A generates the sixth training data 73R3 from the fifth preliminary training data 70R3L and the sixth preliminary training data 71R3N.

In step S14, the processing unit 10A receives input of the type of tissue for learning from the operator on the side of the deep learning apparatus 100A via the input unit 16. The processing unit 10A refers to the window size database 104 (window size DB 104) based on the entered tissue type, sets the window size, refers to the algorithm database 105 (algorithm DB 105), and sets the learning neural network 50. The window size is, for example, 113×113 pixels. This pixel size is a size in an image captured at, for example, 40 times magnification. Exemplarily, it is a size that supports that the entire shape of the cell nucleus region of at least one cell out of two to nine cells is included in the window. The window size is a unit of training data to be input to the neural network 50 at the time of inputting once, and the product of the number of pixels of the first layer structure training data 75R1 of the window size and the number of the primary colors of the colors included in the image corresponds to the number of nodes of the input layer 50$a$. The window size is associated with the tissue type, and stored in the window size database 104 in advance.

In step S15, the processing unit 10A extracts the first layer structure training data of the window size from the first training data 72R1$r$, 72R1$g$, 72R1$b$ and the second training data 73R1 which are the color density encoded diagrams 72R1*r*, 72R1*g*, 72R1*b* 75R1. More specifically, as described above with reference to FIGS. 4A to 4C in the "Outline of the Deep Learning Method" described above, the first layer structure training data 75R1 of the window size is created by the window W1 from the first layer structure training data 74R1 which combines the first training data 72R1*r*, 72R1*g*, 72R1*b* and the second training data 73R1. The processing unit 10A generates the second layer structure training data 75R2 of the window size from the third training data 72R2*r*, 72R2*g*, 72R2*b* and the fourth training data 73R2 which are the color density encoding diagrams 72R2*r*, 72R2*g*, 72R2*b*. Specifically, as described above with reference to FIGS. 4A to 4C and FIG. 5A in the "Outline of the Deep Learning Method", the second layer structure training data 75R2 of the window size is created by the window W1 from the second layer structure training data 74R2 which combines the third training data 72R2*r*, 72R2*g*, 72R2*b* and the fourth training data 73R2 which are the color density encoded diagrams 72R2*r*, 72R2*g*, 72R2*b*. The processing unit 10A generates the third layer structure training data 75R3 of the window size from the fifth training data and the sixth training data 73R3 which are the color density encoding diagrams 72R3*r*, 72R3*g*, and 72R3*b*. Specifically, as described above with reference to FIGS. 4A to 4C and FIG. 5B in the "Outline of the Deep Learning Method", The third layer structure training data 75R3 of the window size is created by the window W1 from the third layer structure training data 74R3 which combines the fifth training data which are the color density encoding diagrams 72R3*r*, 72R3*g*, 72R3*b* and the sixth training data 73R3.

In step S16 shown in FIG. 10, the processing unit 10A uses the first layer structure training data 75R1 of the window size, the second layer structure training data 75R2 and the third layer structure training data 75R3 to cause learning by the neural network 50. The learning result of the neural network 50 is accumulated each time the neural network 50 is learns using the first layer structure training data 75R1, the second layer structure training data 75R2, and the third layer structure training data 75R3 of the window size.

In the image analysis method according to the embodiment, since a convolutional neural network is used and the stochastic gradient descent method is used, in step S17, the processing unit 10A determines whether learning results for a predetermined number of trials are accumulated. The processing unit 10A performs the processing of step S18 when the learning results are accumulated for a predetermined number of trials, and the processing unit 10A performs the processing of step S19 when the learning results are not accumulated for a predetermined number of trials.

When learning results have been accumulated for a predetermined number of trials, in step S18 the processing unit 10A updates the coupling weight w of the neural network 50 using the learning results accumulated in step S16. In the image analysis method according to the embodiment, since the stochastic gradient descent method is used, the coupling weight w of the neural network 50 is updated when the learning results for a predetermined number of trials are accumulated. Specifically, the process of updating the coupling weight w is a process of performing calculation by the gradient descent method shown in (Equation 11) and (Equation 12) described later.

In step S19, the processing unit 10A determines whether the specified number of pixels in each layer structure training data has been processed for each of the first layer structure training data 74R1, the second layer structure training data 74R2, and the third layer structure training data 74R3. When the series of processes from step S16 to step S18 are performed for the specified number of pixels of each layer structure training data, the deep learning process is terminated. Learning of the neural network does not necessarily have to be performed on all the pixels of the layer structure training data 74R1, 74R2, 74R3, inasmuch as the processing unit 10A can perform processing on pixels in part of the layer structure training data 74R1, 74R2, 74R3 images for learning. The prescribed number of pixels also may be all the pixels in the layer structure training data 74R1, 74R2, 74R3.

When the specified number of pixels in the layer structure training data are not processed, In step S20 the processing unit 10A moves the window center position one unit pixel in the first layer structure training data 74R1, the second layer structure training data 74R2, and the third layer structure training data 74R3, as shown in FIG. 4C. Thereafter, the processing unit 10A performs a series of processes from step S15 to step S18 at the new window position after movement. That is, in step S15, the processing unit 10A extracts each layer structure training data 75R1, 75R2, 75R3 of the window size for each of the first layer structure training data 74R1, the second layer structure training data 74R2, and the third layer structure training data 74R3 at the new window position after movement. Subsequently, in step S16, the processing unit 10A causes the neural network 50 to learn using the layer structure training data 75R1, 75R2, 75R3 of the newly cut window size. When learning results for a predetermined number of trials are accumulated in step S17, the processing unit 10A updates the coupling weight w of the neural network 50 in step S18. Learning by the neural network 50 for each window size as described above is performed for a predetermined number of pixels for each of the first layer structure training data 74R1, the second layer structure training data 74R2, and the third layer structure training data 74R3.

The deep layer learning processes of steps S10 to S20 described above improve the degree of learning of the neural network 50 by being repeated for a plurality of pairs of the first training image 70R1 and the second training image 71R1, and a plurality of pairs of the third training image 70R2 and the fourth training image 71R2, and a plurality of pairs of the fifth training image 70R3 and the sixth training image 71R3. In this way a deep learning algorithm 60 of the neural network structure shown in FIG. 5 is obtained.

Neural Network Structure

Figure 12A:
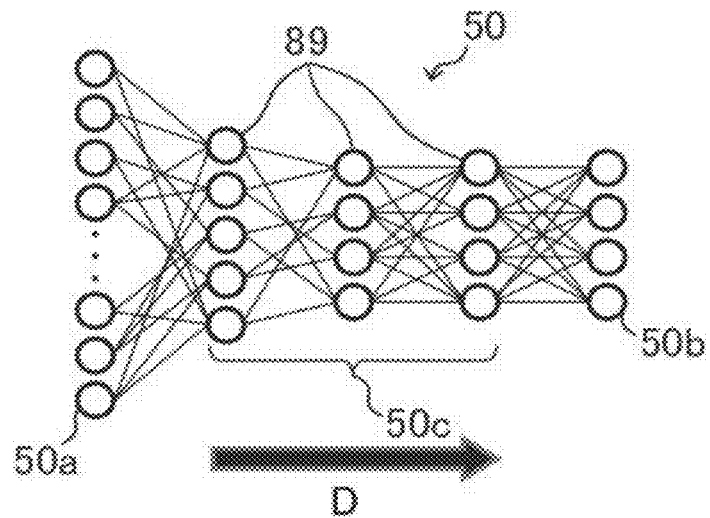
FIGS. 12A, 12B and 12C are schematic diagram describing details of learning by a neural network.

A neural network of a deep learning type is used in the first embodiment as shown in FIG. 12A. The neural network of the deep learning type is configured by an input layer 50*a*, an output layer 50*b*, and an intermediate layer 50*c* between the input layer 50*a* and the output layer 50*b*, and the intermediate layer 50*c* is configured by a plurality of layers as in the neural network shown in FIG. 12. The number of layers configuring the intermediate layer 50*c* may be five or more, for example.

In the neural network 50, a plurality of nodes 89 arranged in layers are connected between layers. In this way information propagates from the input side layer 50*a* to the output side layer 50*b* only in one direction indicated by an arrow D in the drawing. In the present embodiment, the number of nodes of the input layer 50*a* corresponds to the product of the number of pixels of the input image, that is, the number of pixels of the window W1 shown in FIG. 4C and the number of primary colors included in each pixel. Since the pixel data (color density values) of the image can be input to the input layer 50*a*, the user can input the input image to the input layer 50a without separately calculating the feature amount from the input image.

Operation at Each Node

Figure 12B:
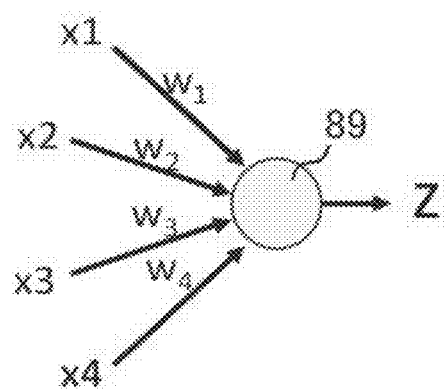

FIG. 12B is a schematic diagram showing the operation at each node. Each node 89 receives a plurality of inputs and calculates one output (z). In the example shown in FIG. 12B, the node 89 receives four inputs. The total input (u) received by the node 89 is expressed by the following (Equation 1).

$$u = w_1 x_1 + w_2 x_2 + w_3 x_3 + w_4 x_4 + b \quad \text{(Equation 1)}$$

Each input is multiplied by a different weight. In equation (1), b is a value called bias. The output (z) of the node is an output of a predetermined function f relative to the total input (u) represented by (Equation 1), and is expressed by the following (Equation 2). The function f is called an activation function.

$$z = f(u) \quad \text{(Equation 2)}$$

Figure 12C:
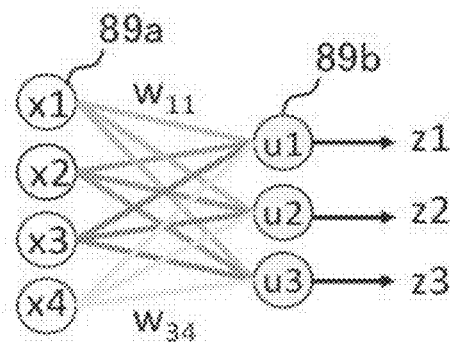

FIG. 12C is a schematic diagram showing the operation between the nodes. In the neural network 50, the nodes that output the result (z) represented by (Equation 2) are arranged in a layered manner relative to the total input (u) represented by (Equation 1). The output of the node of the previous layer becomes the input of the node of the next layer. In the example shown in FIG. 12C, the output of the node 89a on the layer on the left side in the figure becomes the input to the node 89b on the layer on the right side in the figure. Each node 89b of the right side layer receives an output from a node 89a on the left side layer, respectively. Different weights are applied to each coupling between each node 89a on the left side layer and each node 89b on the right side layer. Output of each of the plurality of nodes 89a on the left side layer is designated x1~X4, The inputs to each of the three nodes 89b on the right side layer are represented by the following (Equation 3-1) to (Equation 3-3).

$$u_1 = w_{11} x_1 + w_{12} x_2 + w_{13} x_3 + w_{14} x_4 + b_1 \quad \text{(Equation 3-1)}$$

$$u_2 = w_{21} x_1 + w_{22} x_2 + w_{23} x_3 + w_{24} x_4 + b_2 \quad \text{(equation 3-2)}$$

$$u_3 = w_{31} x_1 + w_{32} x_2 + w_{33} x_3 + w_{34} x_4 + b_3 \quad \text{(equation 3-3)}$$

Generalizing these (Equation 3-1) to (Equation 3-3) results in (Equation 3-4). Here, i=1, ... I, j=1, ... J.

$$u_j = \Sigma_{i=1}^{I} w_{ji} x_i + b_j \quad \text{(Equation 3-4)}$$

Applying Equation 3-4 to the activation function yields the output. The output is expressed by the following (Equation 4).

$$z_j = f(u_j)(j=1,2,3) \quad \text{(Equation 4)}$$

Activation Function

In the image analysis method according to the embodiment, a rectified linear unit function is used as the activation function. The rectified linear unit function is expressed by the following (Equation 5).

$$f(u) = \max(u, 0) \quad \text{(Equation 5)}$$

Equation 5 is a function that sets u=0 among u=0 in the linear function of z=u. In the example shown in FIG. 12C, the output of the node with j=1 is expressed by the following equation according to Equation 5.

$$z_1 = \max((w_{11} x_1 + w_{12} x_2 + w_{13} x_3 + w_{14} x_4 + b_1), 0)$$

Neural Network Learning

Let y (x: w) be the function expressed using the neural network, the function y (x: w) changes as the parameter w of the neural network changes. Adjusting the function y (x: w) so that the neural network selects a more suitable parameter w for the input x is referred to as learning of the neural network. Suppose that multiple sets of inputs and outputs of functions expressed using a neural network are given. Assuming that the desired output for an input x is d, the input/output pair is {(x1, D1), (X2, D2), ... , (xn, Dn)}. The set of each set represented by (x, d) is referred to as training data. Specifically, the set of a set of a color density values for each pixel and a label for a true value image in a single color image of each color of R, G, B shown in FIG. 3B is the training data shown in FIG. 3A.

Learning by a neural network means that when input xn is given to any input/output pair (n, dn), weight w is adjusted so that the output y (xn: w) of the neural network is as close as possible to the output dn.

$$y(x_n : w) \approx d_n$$

An error function is a measure for measuring the proximity between a function expressed using a neural network and training data. The error function is also referred to as a loss function. The error function E(w) used in the image analysis method according to the embodiment is represented by the following (Equation 6). Equation 6 is referred to as cross entropy.

$$E(w) = -\Sigma_{n=1}^{N} \Sigma_{k=1}^{K} d_{nk} \log y_k(x_n; w) \quad \text{(Equation 6)}$$

A method of calculating the cross entropy of (Equation 6) will be described. In the output layer 50b of the neural network 50 used in the image analysis method according to the embodiment, that is, in the final layer of the neural network, an activation function is used for classifying the input x into a finite number of classes according to the content. The activation function is called a softmax function and is expressed below (Equation 7). Note that it is assumed that the same number of nodes as the class number k are arranged in the output layer 50b. The total input u of each node k (k=1, ... , K) of the output layer L is obtained from the output of the previous layer L−1 by uk(L) respectively. In this way the output of the kth node of the output layer can be expressed as follows (Equation 7).

$$y_k \equiv z_k^{(L)} = \frac{\exp(u_k^{(L)})}{\sum_{j=1}^{K} \exp(u_j^{(L)})} \quad \text{(Equation 7)}$$

(Equation 7) is a soft max function. The output y1, ... , yK is usually 1.

If each class is denoted as C1, ... , CK, the output yk (that is, uk (L)) of the node k of the output layer L represents the probability that the given input x belongs to the class Ck. Please refer to Equation 8 below. The input x is classified into a class having the maximum probability represented by Equation 8

$$p(C_k | x) = y_k = z_k^{(L)} \quad \text{(Equation 8)}$$

In the learning of the neural network, the function expressed by the neural network is regarded as a model of the posterior probability of each class, and the likelihood of the weight w relative to the training data under such a probability model is evaluated and a weight w that maximizes likelihood is selected.

The target output do by the softmax function of (Equation 7 is set to 1 only when the output is a correct class, and set to 0 when the output is otherwise. When the target output is expressed as vector form dn=[Dn1, ... , dnK], for example, when the correct class of input xn is C3, only the target output dn3 is 1, and the other target outputs are 0. When encoding in this manner, the posterior distribution is represented as follows (Equation 9).

$$p(d|x) = \Pi_{k=1}^{K} p(C_k|x)^{d_k} \quad \text{(Equation 9)}$$

Training data {(xn, Dn)} (N=1, . . . , N) is expressed as follows (Equation 10). The error function of Equation 6 is derived by taking the logarithm of the likelihood L (w) and inverting the sign.

$$L(w) = \prod_{n=1}^{N} p(d_n \mid x_n; w) = \quad \text{(Equation 10)}$$

$$\prod_{n=1}^{N}\prod_{k=1}^{K} p(C_k \mid x_n)^{d_{nk}} = \prod_{n=1}^{N}\prod_{k=1}^{K} (y_k(x; w))^{d_{nk}}$$

Learning means minimizing the error function E(w) calculated based on the training data for the parameter w of the neural network. In the image analysis method according to the embodiment, the error function E(w) is expressed by (Equation 6).

Minimizing the error function E(w) for the parameter w has the same meaning as finding the local minima of the function E(w). The parameter w is the weight of the coupling between the nodes. The minimum point of the weight w is obtained by iterative calculation that iteratively updates the parameter w using an arbitrary initial value as a starting point. An example of such a calculation is the gradient descent method.

In the gradient descent method, a vector expressed by the following Equation 11 is used $$\nabla E = \frac{\partial E}{\partial w} = \left[\frac{\partial E}{\partial w_1}, \ldots, \frac{\partial E}{\partial w_M}\right]^T \quad \text{(Equation 11)}$$

In the gradient descent method, the process of moving the value of the current parameter w in the negative gradient direction (that is, $-\nabla E$) is repeated many times. When the current weight is designated w(t) and the weight after movement is w(t+1), the calculation by the gradient descent method is represented by the following Equation 12. The value t means the number of times the parameter w has been moved.

$$w^{(t+1)} = w^{(t)} - \epsilon \nabla E \quad \text{(Equation 12)}$$

The symbol $$\epsilon$$

is a constant that determines the magnitude of the update amount of the parameter w, and is referred to as a learning coefficient. By repeating the operation represented by (Equation 12), the error function E(w(w)(t)) decreases, and the parameter w reaches the minimum point.

Note that the calculation according to Equation 12 may be performed on all the training data (n=1, . . . , N) or may be performed only on a part of the training data. The gradient descent method performed for only some of the training data is referred to as the stochastic gradient descent method. A stochastic gradient descent method is used in the image analysis method according to the embodiment.

Image Analysis Process

Figure 13:
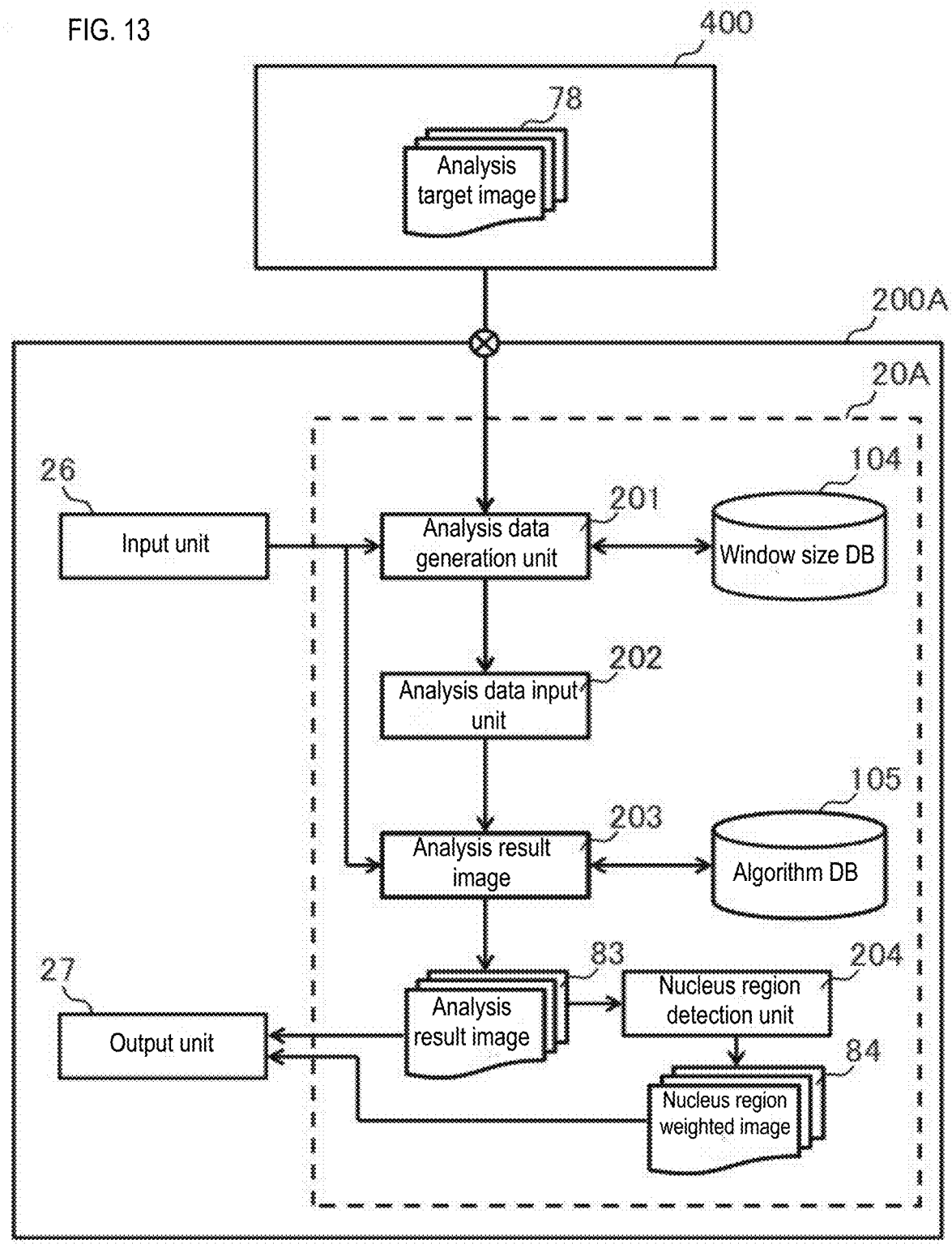
FIG. 13 is a block diagram describing the functions of a image analysis apparatus 200A according to the first embodiment.

Referring to FIG. 13, the processing unit 20A of the image analysis apparatus 200A according to the first embodiment includes an analysis data generation unit 201, an analysis data input unit 202, an analysis unit 203, and a nucleus region detection unit 204. These functional blocks are realized by installing a program according to the present invention for causing a computer to execute an image analysis process in the storage unit 23 or the memory 22 of the processing unit 20A, and executing this program by the CPU 21. The window size database 104 and the algorithm database 105 are provided from the deep learning apparatus 100A through the recording medium 98 or the network 99, and recorded in the storage unit 23 or the memory 22 of the processing unit 20A.

The analysis target image 78 of the analysis target tissue is captured in advance by the imaging device 400, and recorded in the storage unit 23 or the memory 22 of the processing unit 20A in advance. The deep learning algorithm 60 including the learned coupling weight w is stored in the algorithm database 105 in association with the type of tissue sample (for example, tissue name) from which the sample of the analysis target tissue is derived or the type of sample including cells, and functions as a program module which is a part of a program that causes a computer to execute an image analysis process. That is, the deep learning algorithm 60 is used in a computer having a CPU and a memory, and causes the computer to function to execute computation or processing of specific information corresponding to the purpose of use, such as outputting data indicating the layer structure of the tissue in the analysis target. Specifically, the CPU 21 of the processing unit 20A performs the calculation of the neural network 60 based on the learned coupling weight w in accordance with the algorithm prescribed in the deep learning algorithm 60 recorded in the storage unit 23 or the memory 22. The CPU 21 of the processing unit 20A performs an operation on the captured analysis target image 78 of the analysis target tissue which is input to the input layer 60a, and outputs from the output layer 60b label value 83 of the data indicating the layer structure in the analysis target tissue.

Figure 14:
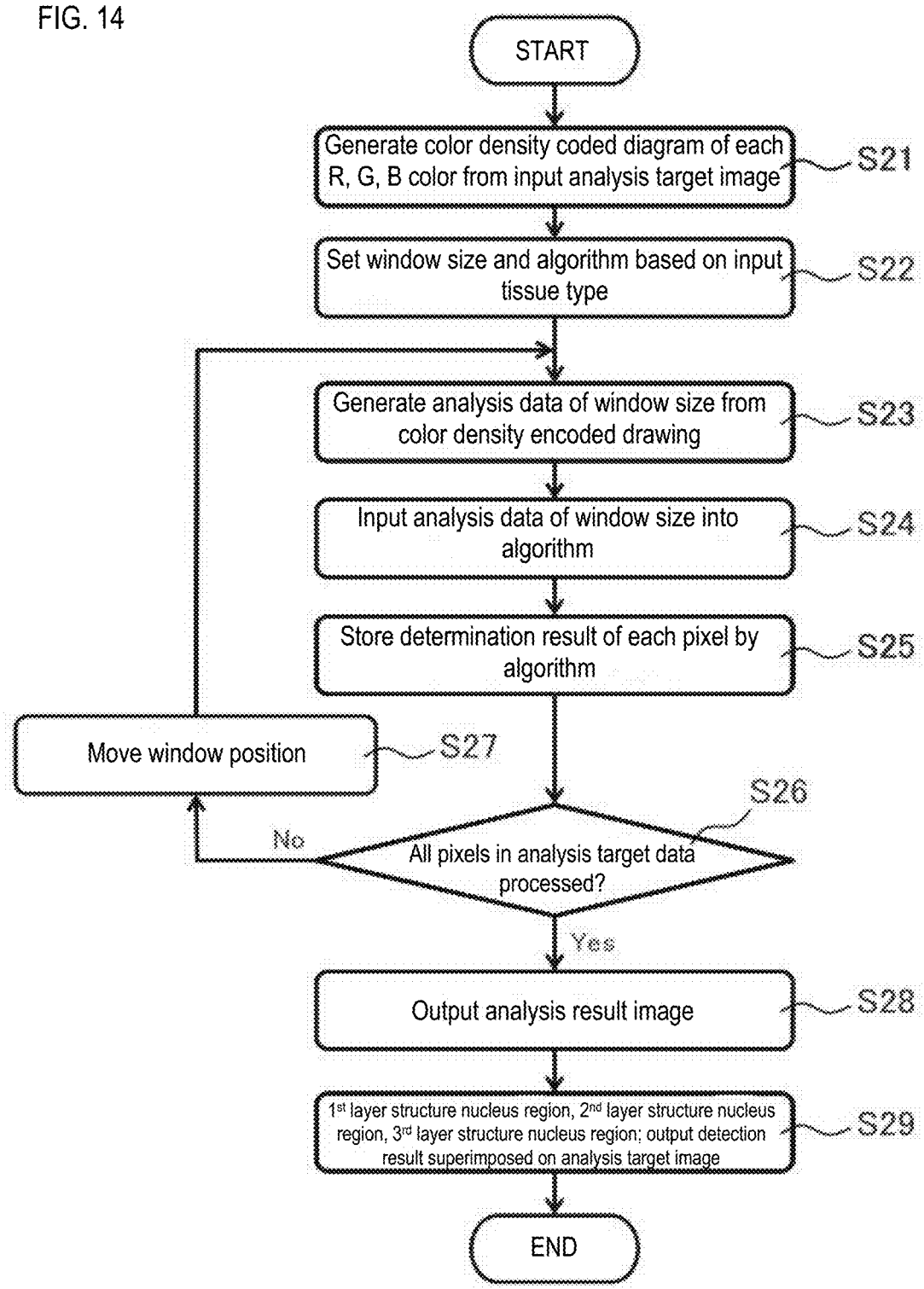
FIG. 14 is a flowchart showing a procedure of image analysis processing.

Referring to FIG. 14, the processing unit 20A of the image analysis apparatus 200A performs the processes shown in FIG. 13. When describing each function block shown in FIG. 13, the processes of steps S21 and S22 are performed by the analysis data generation unit 201. The processes of steps S23, S24, S26, and S27 are performed by the analysis data input unit 202. The processes of steps S25 and S28 are performed by the analysis unit 203. The process of step S29 is performed by the nucleus region detection unit 204.

In step S21, the processing unit 20A extracts, from the input analysis target image 78, the color density encoded diagrams 79r, 79g, and 79b of the respective colors of R, G, and B. Color density encoded diagrams 79r, 79g, and 79b are data to be analyzed. The generation method of the color density encoded diagrams 79r, 79g, and 79b is the same as the generation method at the time of the deep learning process shown in FIG. 110.

In step S22 shown in FIG. 14, the processing unit 20A accepts the input of the tissue type from the user on the image analysis apparatus 200A side as the analysis condition through the input unit 26. The processing unit 20A refers to the window size database 104 and the algorithm database 105 on the basis of the entered tissue type to set the window size used for analysis, and acquires the deep learning algorithm 60 used for analysis. The window size is a unit of analysis data to be input to the neural network 60 at the time of one input, and the product of the number of pixels of the window size analysis data 80 and the number of primary colors included in the image corresponds to the number of nodes of input layer 60a. The window size is associated with the tissue type, and stored in the window size database 104 in advance. The window size is, for example, 3×3 pixels as shown in the window W2 of FIG. 6. The deep learning algorithm 60 is also stored in advance in the algorithm database 105 shown in FIG. 13 in association with the tissue type. In step S23 shown in FIG. 14, the processing unit 20A generates the window size analysis data 80 from the color density encoded diagrams 79r, 79g, and 79b.

In step S24, the processing unit 20A inputs the analysis data 80 shown in FIG. 5 to the deep learning algorithm 60. The initial position of the window is, for example, a position at the center of 3×3 pixels in the window corresponding to the upper left corner of the analysis target image, as in step S16 in the deep learning process. When the processing unit 20A inputs the data 81 of a total of 27 color density values of 3×3 pixels x 3 primary colors included in the window size analysis data 80 to the input layer 60a, the deep learning algorithm 60 outputs determination result 82 to the output layer 60b.

In step S25 shown in FIG. 14, the processing unit 20A records the determination result 82 output to the output layer 60b shown in FIG. 5. The determination result 82 is an estimated value (four values) of pixels located at the center of the color density encoded diagrams 79r, 79g, and 79b, which are analysis targets.

In step S26 shown in FIG. 14, the processing unit 20A determines whether all the pixels in the input data have been processed. If all the pixels in the analysis target data have undergone the series of processing from step S23 to step S25 shown in FIG. 14, the processing of step S28 is performed.

When all the pixels in the analysis target data have not been processed, the processing unit 20A moves the center position of the window W2 by 1 pixel unit in the analysis object data in the analysis target data in step S27 as in step S20 in the deep learning process. Thereafter, the processing unit 20A performs a series of processes from step S23 to step S25 at the position of the new window W2 after movement. In step S25, the processing unit 20A records the determination result 82 corresponding to the new window position after the movement. A label value 83 of the analysis result is obtained by storing the discrimination result 82 for each window size on all the pixels in the analysis target image. The image size of the label value 83 of the analysis result is the same as the image size of the analysis target image. Here, in the label value 83, the value 2, the value 1 and the value 0 of the estimated value may be numerical data attached to each pixel, and also may be an image indicated by a display color associated with, for example, the value 2, the value 1 and the value 0 instead of the estimated value 2, value 1 and value 0. In step S28 shown in FIG. 14, the processing unit 20A outputs the label value 83 of the analysis result to the output unit 27.

In step S29 following step S28, the processing unit 20A also performs a nucleus region detection process on the label value 83 of the analysis result. In the label value 83, the nucleus region of the cell of the first layer structure, the nucleus region of the cell of the second layer structure, the nucleus region of the cell of the third layer structure, and the region other than the nucleus region are expressed and distinguished by four values.

Although optional, the processing unit 20A also may create the layer structure nucleus region weighted image 84 in which the obtained label value 83 is displayed in a color corresponding to the label value. The processing unit 20A outputs the created nucleus region weighted image 84 to the output unit 27, and ends the image analysis process.

Figure 19:
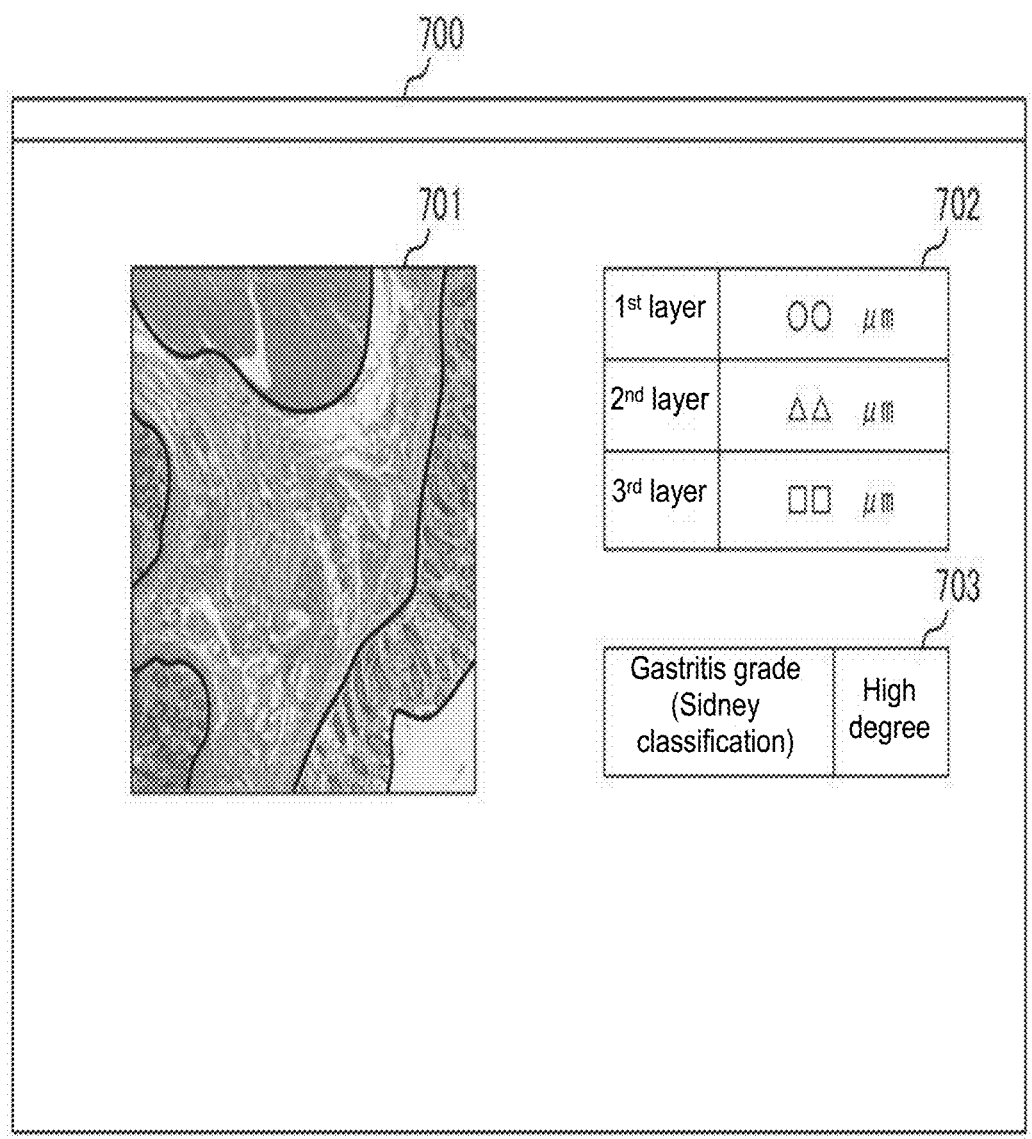
FIG. 19 is a diagram showing a display example of a result.

FIG. 19 shows an example of a user interface (display on the output unit 27) for displaying the image processing result. The display screen 700 displays a display area 701 indicating the boundary of each layer on the analysis target image 78, a layer structure display area 702 showing the thickness of each layer, and a disease grade display area 703 for displaying the grade of disease (grade of gastritis by Sydney classification, for example). By doing this, it is possible to perform the analysis from the display of the result without depending on the eyes of the pathologist.

Figure 20:
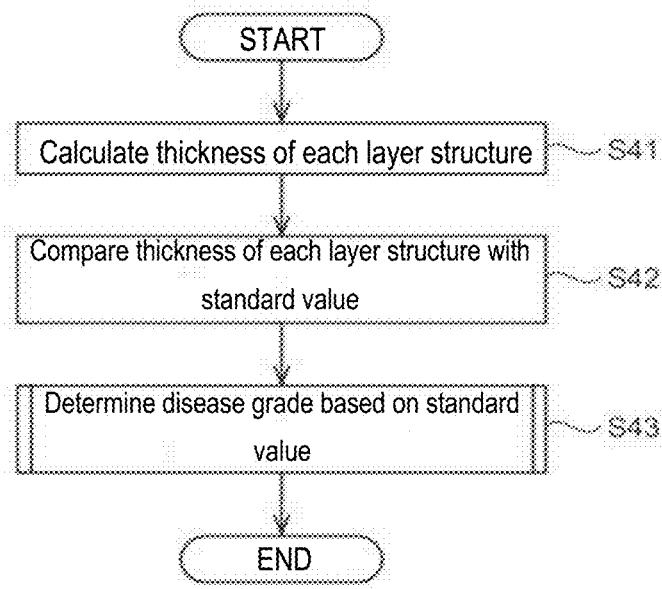
FIG. 20 is a flowchart showing a procedure for determining a grade of a disease.

In the case of displaying the grade of the disease, as shown in FIG. 20, the processing unit 20A calculates the thickness of each layer structure based on the distribution of nucleus regions of the cells of each layer structure (step S41). Subsequently, the processing unit 20A compares the reference value of the thickness of each layer structure stored in the storage unit 23 with the thickness of each layer structure calculated in step S41 (step S42). The processing unit 20A extracts from the grade of the disease (normal, mild, moderate, high in the case of Sydney classification of gastritis) correlated with the reference value of the thickness of each layer structure stored in the storage unit 23, and determines the disease grade of the tissue included in the image 78 (step S43).

As described above, the user of the image analysis apparatus 200A can acquire the label value 83 as the analysis result by inputting the analysis target image 78 of the analysis target tissue to the image analysis apparatus 200A. Label value 83 is a value obtained by displaying the nucleus region of the cell of the first layer structure, the nucleus region of the cell of the second layer structure, the nucleus region of the cell of the third layer structure, and the user can discriminate the nucleus region of each layer structure in the sample to be analyzed.

The user of the image analysis apparatus 200A also can acquire the nucleus region weighted image 84 as the analysis result. The cell nucleus region weighted image 84 is generated, for example, by filling the region of the cell nucleus with a color in the analysis target image 78. In another embodiment, the cell nucleus region weighted image 84 is generated by overlapping a boundary line between a region of cell nucleus of each layer structure and another region. In this way the user can grasp the nucleus region of each layer structure at a glance in the tissue to be analyzed, and it is possible to grasp the layer structure at a glance.

Indicating the layer structure configuring the tissue in the sample to be analyzed helps a person who is not familiar with sample to grasp the structure of each layer.

Second Embodiment

Hereinafter, the image analysis system according to the second embodiment will be described with respect to points different from the image analysis system according to the first embodiment.

Structure Summary

Figure 15:
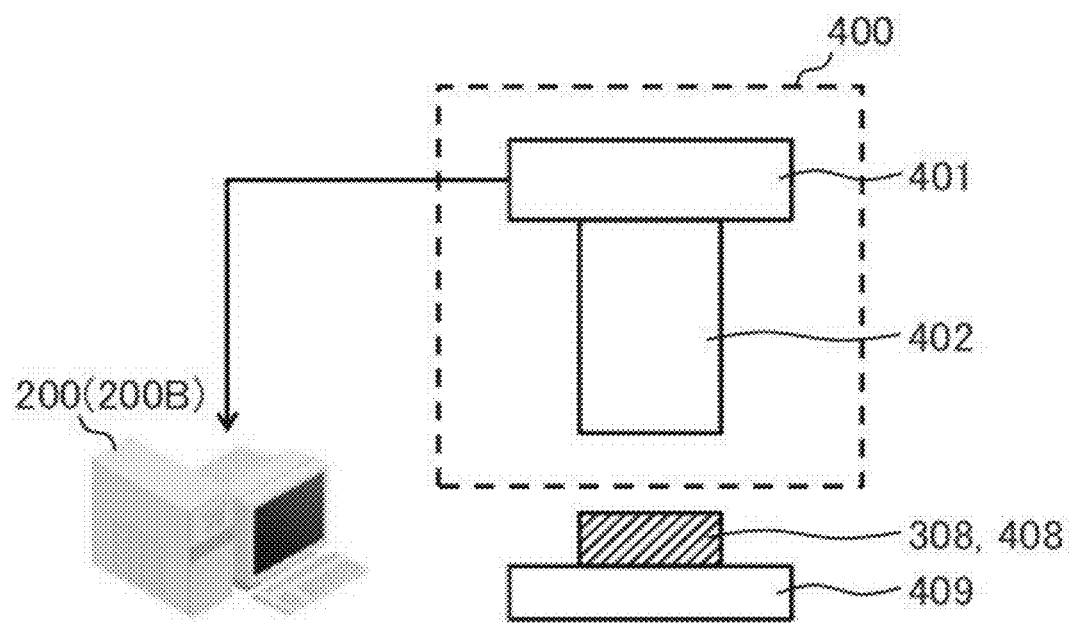
FIG. 15 is a brief structural diagram of an image analysis system according to a second embodiment.

Referring to FIG. 15 the image analysis system according to the second embodiment includes a user side apparatus 200, and the user side apparatus 200 operates as an integrated image analysis apparatus 200B. The image analysis apparatus 200B is configured by, for example, a general-purpose computer, and performs both of the deep learning process and the image analysis process described in the first embodiment. That is, the image analysis system according to the second embodiment is a stand-alone system that performs deep learning and image analysis on the user side. The image analysis system according to the second embodiment differs from the image analysis system according to the first embodiment in that the integrated type image analysis apparatus 200B installed on the user side has the functions of both the deep learning apparatus 100A and the image analysis apparatus 200A according to the first embodiment.

The image analysis apparatus 200B is connected to the imaging apparatus 400. At the time of the deep learning process, the imaging device 400 acquires the training image of the tissue for learning and acquires the analysis target image 78 of the tissue to be analyzed at the time of image analysis processing.

Hardware Structure

The hardware configuration of the image analysis apparatus 200B is similar to the hardware configuration of the user side apparatus 200 shown in FIG. 9.

Function Block and Processing Procedure

Figure 16:
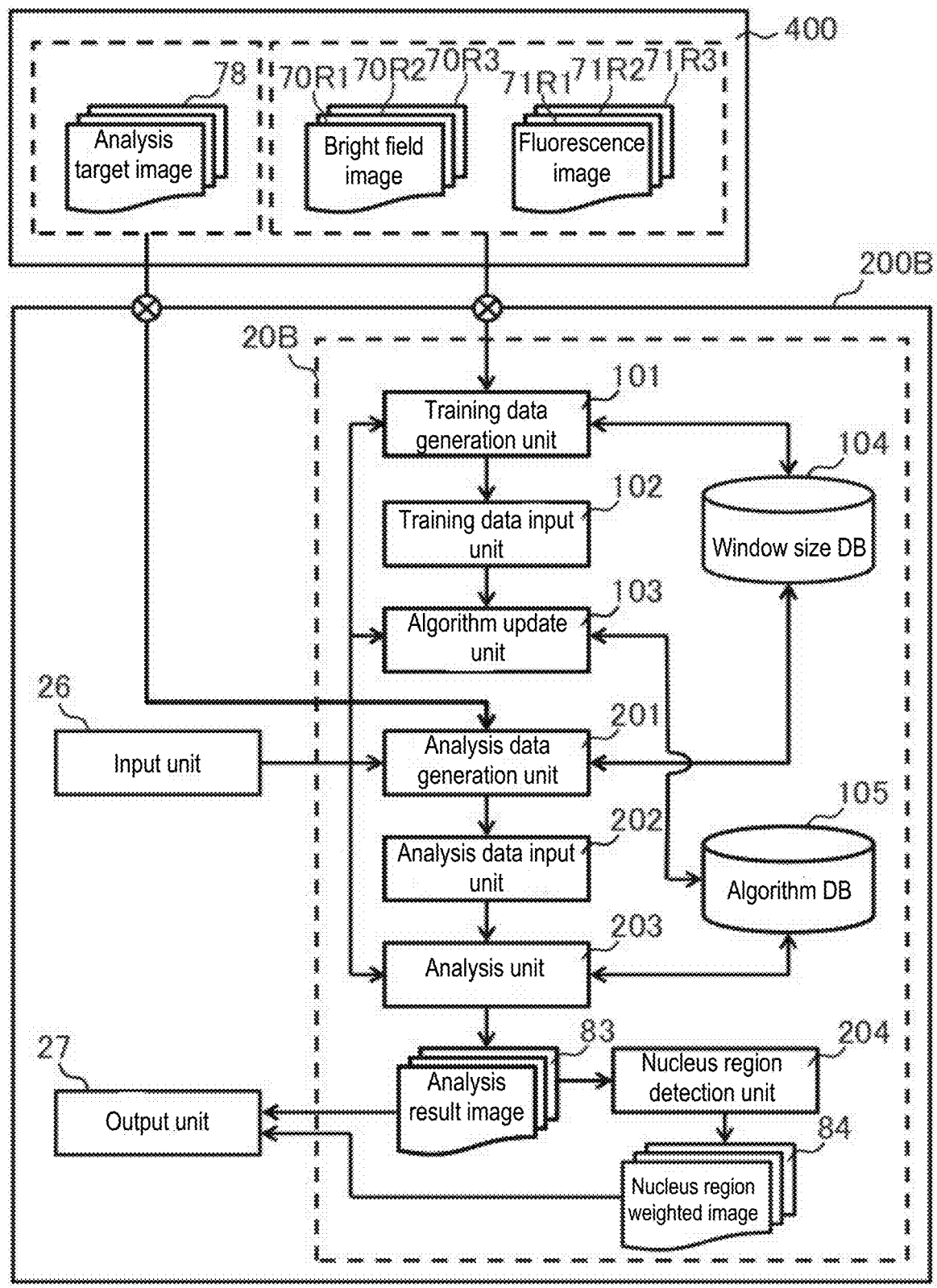
FIG. 16 is a block diagram describing the function of an integrated type image analysis apparatus 200B according to the second embodiment.

Referring to FIG. 16, the processing unit 20B of the image analysis apparatus 200B according to the third embodiment includes a training data generation unit 101, a training data input unit 102, an algorithm update unit 103, an analysis data generation unit 201, an analysis data input unit 202, an analysis unit 203, and a nucleus region detection unit 204. These functional blocks are realized by installing a program that causes a computer to execute a deep learning process and an image analysis process in the storage unit 23 or the memory 22 of the processing unit 20B, and executing this program by the CPU 21. The window size database 104 and the algorithm database 105 are recorded in the storage unit 23 or the memory 22 of the processing unit 20B, and both are used jointly during deep learning and image analysis processing. The learned neural network 60 is stored beforehand in the algorithm database 105 in association with the type of tissue or the type of sample including cells, the coupling weight w is updated by the deep learning process, and stored as the deep learning algorithm 60 in the algorithm database 105. A first training image 70R1, a second training image 71R1, a third training image 70R2, a fourth training image 71R2, a fifth training image 70R3, and a sixth training image 71R3 for learning samples are captured in advance by the imaging device 400 and stored in the storage unit 23 or memory 22 of the processing unit 20B in advance. The analysis target image 78 of the analysis target sample is also imaged in advance by the imaging apparatus 400 and stored in the storage unit 23 or the memory 22 of the processing unit 20B in advance.

The processing unit 20B of the image analysis apparatus 200B performs the processing shown in FIG. 11 at the time of the deep learning process, and the processing shown in FIG. 14 at the time of the image analysis process. When describing each function block shown in FIG. 16, the processes of steps S10 to S14, S19 and S20 are performed by the training data generating unit 101 during the deep learning process. The process of step S15 is performed by the training data input unit 102. The processes of steps S16 to S18 are performed by the algorithm updating unit 103. The processes of steps S21 and S22 are performed by the analysis data generation unit 201 at the time of image analysis process. The processes of steps S23, S24, S26, and S27 are performed by the analysis data input unit 202. The processes of steps S25 and S28 are performed by the analysis unit 203. The process of step S29 is performed by the nucleus region detection unit 204.

The procedure of the deep learning process and the procedure of the image analysis process performed by the image analysis apparatus 200B according to the second embodiment are similar to the procedures performed by the deep learning apparatus 100A and the image analysis apparatus 200A according to the first embodiment. Note that the image analysis apparatus 200B according to the second embodiment differs from the deep learning apparatus 100A and the image analysis apparatus 200A according to the first embodiment in the following points.

In step S14 at the time of the deep learning process, the processing unit 20B receives an input of the type of tissue for learning from the user of the image analysis apparatus 200B via the input unit 26. The processing unit 20B sets the window size by referring to the window size database 104 based on the type of the input tissue, and refers to the algorithm database 105 to set the neural network 50 used for learning.

As described above, the user of the image analysis apparatus 200B can acquire the label value 83 as the analysis result by inputting the analysis target image 78 to the image analysis apparatus 200B. The user of the image analysis apparatus 200B also can acquire the layer structure nucleus region weighted image 84 as the analysis result.

According to the image analyzing apparatus 200B of the second embodiment, the user can use the type of tissue selected by the user as a tissue for learning. This means that the learning of the neural network 50 is not left to the vendor side, and the user himself can improve the degree of learning of the neural network 50.

Third Embodiment

Hereinafter, the image analysis system according to a third embodiment will be described with respect to points different from the image analysis system according to the second embodiment.

Structure Summary

Figure 17:
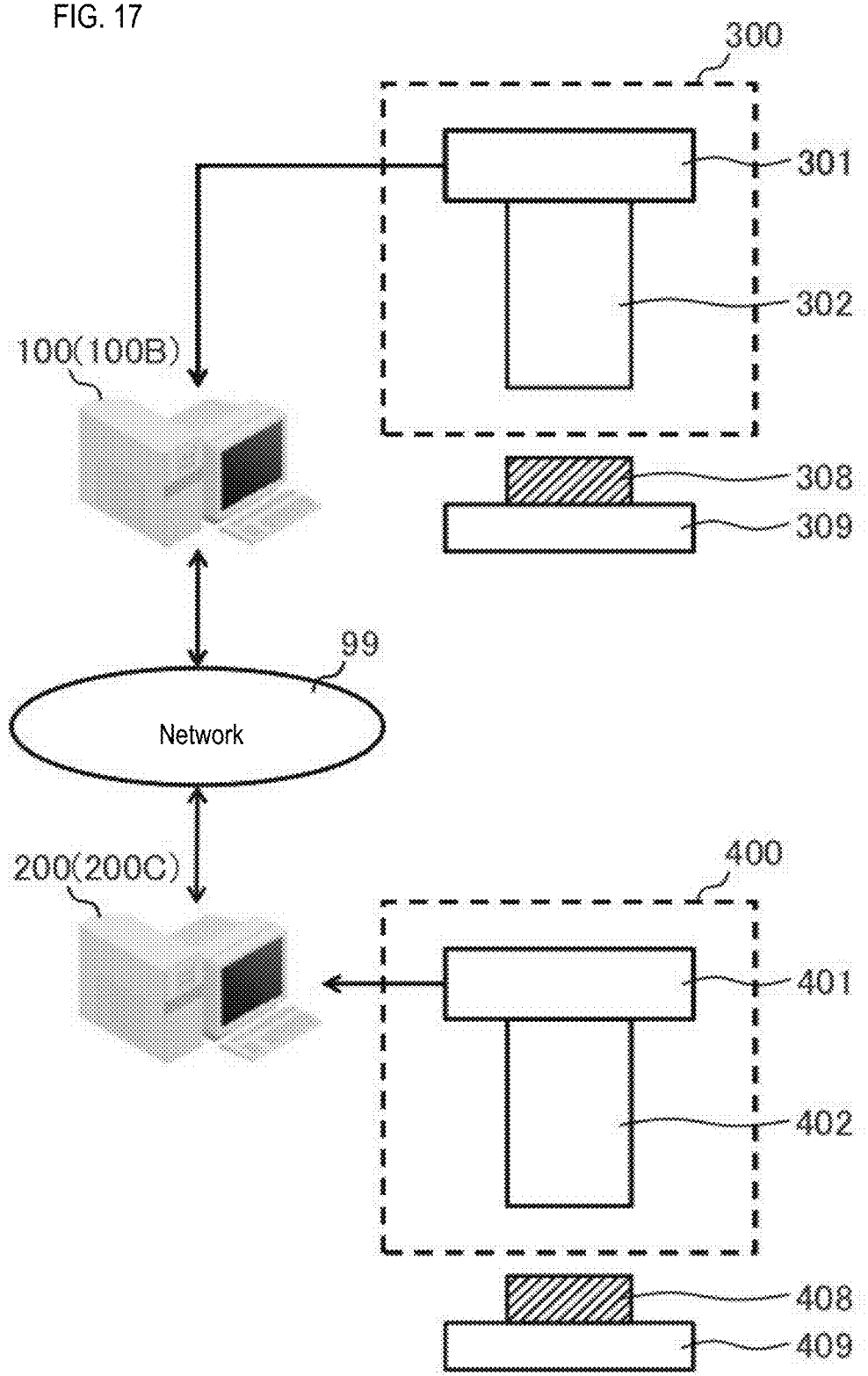
FIG. 17 is a brief structural diagram of an image analysis system according to a third embodiment.

Referring to FIG. 17, the image analysis system according to the third embodiment includes a vender side apparatus 100 and a user side apparatus 200. The vendor side apparatus 100 operates as an integrated type image analysis apparatus 100B and the user side apparatus 200 operates as the terminal apparatus 200C. The image analysis apparatus 100B is, for example, a general-purpose computer and is a device on the cloud server side that performs both of the deep layer learning process and the image analysis process described in the first embodiment. The terminal apparatus 200C is composed of, for example, a general-purpose computer, and is a user side terminal apparatus that transmits an analysis target image to the image analysis apparatus 100B via the network 99, and receives an image of the analysis result from the image analysis apparatus 100B via the network 99.

The image analysis system according to the third embodiment is similar to the image analysis system according to the second embodiment in that the integrated image analysis apparatus 100B installed on the vendor side has the functions of both the deep learning apparatus 100A and the image analysis apparatus 200A according to the first embodiment. On the other hand, the image analysis system according to the third embodiment differs from the image analysis system according to the second embodiment in that it is provided a terminal apparatus 200C and supplies the input interface of the analysis target image and the output interface of the analysis result image to the terminal apparatus 200C on the user side. That is, the image analysis system according to the third embodiment is a client service type system in which the vendor side performs a deep learning process and an image analysis process and provides a cloud service type of input/output interface for analysis target images and analysis result images to the user side.

The image analysis apparatus 100B is connected to the imaging apparatus 300, and acquires a training image of a tissue for learning which is captured by the imaging apparatus 300.

The terminal apparatus 200C is connected to the imaging apparatus 400, and acquires the analysis target image 78 of the analysis target tissue which is imaged by the imaging apparatus 400.

Hardware Structure

The hardware configuration of the image analysis apparatus 100B is similar to the hardware configuration of the vendor-side apparatus 100 shown in FIG. 7. The hardware configuration of the terminal apparatus 200C is the same as the hardware configuration of the user apparatus 200 shown in FIG. 9.

Function Block and Processing Procedure

Figure 18:
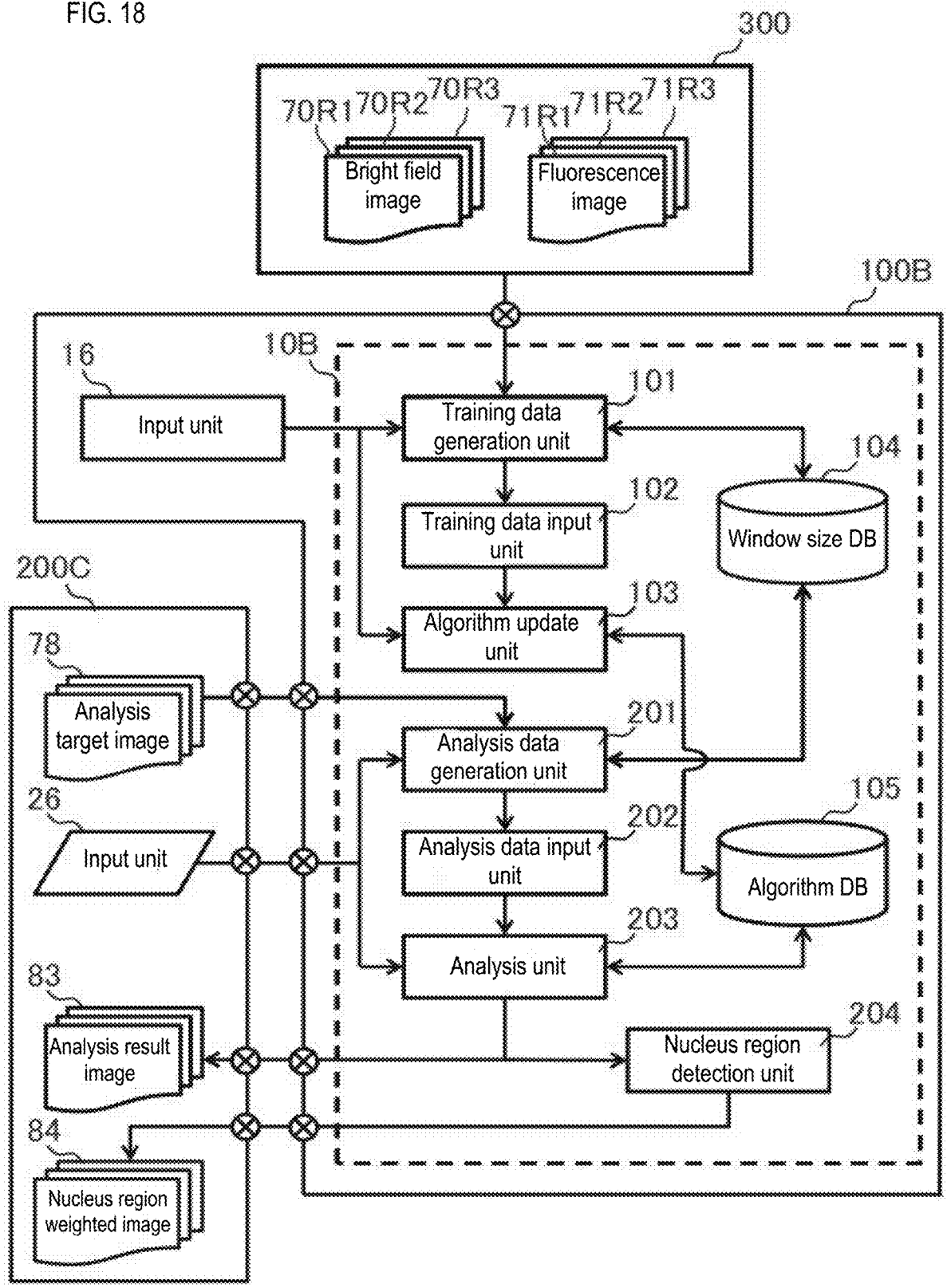
FIG. 18 is a block diagram describing the functions of an integrated type image analysis apparatus 100B according to the third embodiment.

Referring to FIG. 18, the processing unit 20B of the image analysis apparatus 200B according to the third embodiment includes a training data generation unit 101, a training data input unit 102, an algorithm update unit 103, an analysis data generation unit 201, an analysis data input unit 202, an analysis unit 203, and a nucleus region detection unit 204. These functional blocks are realized by installing a program that causes a computer to execute a deep learning process and an image analysis process in the storage unit 13 or the memory 12 of the processing unit 10B, and executing this program by the CPU 11. The window size database 104 and the algorithm database 105 are recorded in the storage unit 13 or the memory 12 of the processing unit 10B, and both are used jointly during deep learning and image analysis processing. The learned neural network 50 is stored beforehand in the algorithm database 105 in association with the type of tissue, the coupling weight w is updated by the deep learning process, and stored as the deep learning algorithm 60 in algorithm data base 105.

A first training image 70R1, a second training image 71R1, a third training image 70R2, a fourth training image 71R2, a fifth training image 70R3, and a sixth training image 71R3 for training images are captured in advance by the imaging device 300 and stored in the storage unit 13 or memory 12 of the processing unit 10B in advance. The analysis target image 78 of the analysis target tissue is also imaged in advance by the imaging apparatus 400 and recorded in the recording unit 23 or the memory 22 of the processing unit 20C of the terminal apparatus 200C in advance.

The processing unit 10B of the image analysis apparatus 100B performs the processing shown in FIG. 11 at the time of the deep learning process, and the processing shown in FIG. 14 at the time of the image analysis process. When describing each function block shown in FIG. 18, the processes of steps S10 to S14, S19 and S20 are performed by the training data generation unit 101 during the deep learning process. The process of step S15 is performed by the training data input unit 102. The processes of steps S16 to S18 are performed by the algorithm updating unit 103. The processes of steps S21 and S22 are performed by the analysis data generation unit 201 at the time of image analysis process. The processes of steps S23, S24, S26, and S27 are performed by the analysis data input unit 202. The processes of steps S25 and S28 are performed by the analysis unit 203. The process of step S29 is performed by the nucleus region detection unit 204.

The procedure of the deep learning process and the procedure of the image analysis process performed by the image analysis apparatus 100B according to the third embodiment are similar to the procedures performed by the deep learning apparatus 200A and the image analysis apparatus 200A according to the first embodiment. Note that the image analysis apparatus 100B according to the third embodiment differs from the deep learning apparatus 100A and the image analysis apparatus 200A according to the first embodiment in the following points.

The processing unit 10B receives the analysis target image 78 of the analysis target tissue from the terminal apparatus 200C on the user side, and generates color density encoded diagrams 79r, 79g, and 79b of R, G, and B colors from the received analysis target image 78 in step S21 during the image analysis process shown in FIG. 14. The generation method of the color density encoded diagrams 79r, 79g, and 79b is the same as the generation method at the time of the deep learning process shown in FIG. 110.

In step S22 at the time of the image analysis process shown in FIG. 14, the processing unit 10B receives the input of the tissue type from the user of the terminal apparatus 200C as the analysis condition through the input unit 26 of the terminal apparatus 200C. The processing unit 10B refers to the window size database 104 and the algorithm database 105 on the basis of the entered tissue type to set the window size used for analysis, and acquires the deep learning algorithm 60 used for analysis.

In step S28 during the image analysis process, the processing unit 10B transmits the label value 83 of the analysis result to the terminal apparatus 200C on the user side. In the terminal apparatus 200C on the user side, the processing unit 20C outputs the label value 83 of the received analysis result to the output unit 27.

In step S29 during the image analysis process, the processing unit 10B also performs a detection process of the nucleus region label value 83 of the analysis result following step S28. Although an optional step, the processing unit 10B also may create the layer structure nucleus region weighted image 84 displayed in color corresponding to the label value 83. The processing unit 10B transmits the created layer structure nucleus region weighted image 84 to the user terminal apparatus 200C. In the terminal device 200C on the user side, the processing unit 20C outputs the received layer structure nucleus region weighted image 84 to the output unit 27, and ends the image analysis process.

As described above, the user of the terminal apparatus 200C can acquire the label value 83 as the analysis result by transmitting the analysis target image 78 of the analysis target tissue to the image analysis apparatus 100B. The user of the terminal apparatus 200C also can acquire the layer structure nucleus region weighted image 84 as the analysis result.

According to the image analysis apparatus 100B of the third embodiment, the user can be given the result of the image analysis process without acquiring the window size database 104 and the algorithm database 105 from the depth learning apparatus 100A. In this way, it is possible to provide a service that distinguishes a nucleus region of each layer structure and presents each layer structure in each tissue as a cloud service for analyzing the analysis target tissue.

The number of pathologists is inadequate across the country. Pathologists are enrolled in a major hospital in urban areas, but most are not in remote medical institutions or in relatively small medical institutions such as clinics even in urban areas. The cloud service provided by the image analysis apparatus 100B and the terminal apparatus 200C aids tissue diagnosis and in remote places or relatively small medical institutions.

Computer Program

The embodiments of the present invention includes a computer program for generating the learned deep layer learning algorithm and the product thereof by having the processing units 10A, 20B, and 10B execute the above steps S10 to S20. The embodiment of the present invention also includes a computer program for causing the processing units 10A, 20B, 10B to execute the steps S21 through S29, and causing a computer to function to analyze an image of a tissue collected from a subject, and a product thereof.

Other Aspects

Although the present invention has been described in accordance with the summary and specific embodiments, the present invention is not limited to the above-described summary and specified embodiments.

Although the processing units 10A, 20B, and 10B refer to the window size database 104 to set the number of pixels of the window size in step S14 in the first to third embodiments, setting the pixel number of the window size may be directly set by the operator or the user. In this case, the window size database 104 is unnecessary.

Although the processing units 10A, 20B, and 10B set the number of pixels of the window size based on the type of the input tissue in step S14 in the first to third embodiments, the size of the tissue also may be input instead of inputting the type of tissue. The processing units 10A, 20B, and 10B may set the number of pixels of the window size by referring to the window size database 104 based on the size of the input tissue. In step S22, as in step S14, the size of the tissue may be input instead of entering the type of tissue. The processing units 20A, 20B, and 10B may refer to the window size database 104 and the algorithm database 105 to set the number of pixels of the window size and acquire the neural network 60 based on the size of the input tissue.

Regarding the mode of entering the size of the tissue, the size may be directly input as a numerical value, or a user may input a predetermined numerical range corresponding to the size to be selected and input by the user, for example, using the input user interface as a pull-down menu.

In step S14 and step S22, in addition to the tissue type or the tissue size, the imaging magnification at the time of imaging the analysis target image 78 and the training image may be input. Regarding the mode of inputting the imaging magnification, the magnification may be directly input as a numerical value, or a user may select a predetermined numerical range corresponding to the magnification that the user intends to input, for example, using the input user interface as a pull-down menu.

Although the window size is set to 3×3 pixels for the sake of convenience in the deep learning process and the image analysis process in the first to third embodiments, the number of pixels of the window size is not limited to this. The window size may be set according to the type of tissue, for example. In this case, it suffices that the product of the number of pixels of the window size and the number of primary colors included in the image corresponds to the number of nodes of the input layers 50a and 60a of the neural networks 50 and 60.

In step S14, the processing units 10A, 20B, and 10B also may acquire the number of pixels of the window size and correct the number of pixels of the acquired window size based on the input imaging magnification.

In step S18, the processing units 10A, 20B, and 10B store the deep layer learning algorithm 60 in the algorithm database 105 in association with the tissue type on a one-to-one basis in the first to third embodiments. Alternatively, in step S18, the processing units 10A, 20B, 10B also may associate a plurality of tissue types with one deep learning algorithm 60 and store them in the algorithm database 105.

In the first to third embodiments the hue is defined by a combination of three primary colors of light or a combination of three primary colors of light, but the number of hues is not limited to three. The number of hues also may be four primary colors plus yellow (Y) to red (R), green (G), and blue (B), or three primary colors of red (R), green (G), and blue (B) It may be a two primary color in which any one hue is reduced as two primary colors. Alternatively, one primary color of only one of the three primary colors of red (R), green (G), and blue (B) (for example, green (G)) may be used. For example, the bright field images 70R1, 70R2, 70R3 and the analysis target image 78 acquired using a known microscope, a virtual slide scanner, or the like also are not limited to color images of three primary colors of red (R), green (G), and blue (B) inasmuch as the images may be a color image of two primary colors or an image including one or more primary colors.

In the first to third embodiments, although the processing units 10A, 20B, and 10B generate each color density encoded image of the training image (color density encoded diagrams 70R1r, 70R1g, 70R1b, color density encoded diagrams 70R2r, 70R2g, 70R2b, color density encoded diagrams 70R3r, 70R3g, 70R3b) as 8-bit (256 levels) single color image of each primary color in step S10, the gradation of the primary color when creating each color density encoded diagram is not limited to 8 bits. The gradation of each color density encoded diagram also may depend on the imaging condition of the slide image scanner. For example, it may be an image of 1 bit or more and 2 bits, 4 bits, 16 bits, 24 bits. Similarly, although the processing units 20A, 20B, and 10B generate single color images for each primary color for the color density encoded diagrams 79r, 79g, and 79b in step S21, the gradation of the primary color when creating the color density encoded diagram is not limited to 3 gradations. Primary colors when creating color density coded diagrams are not limited to 8 bits. The gradation of the color density encoded diagrams 79r, 79g, and 79b may depend on the imaging conditions of the slide image scanner. For example, it may be an image of 1 bit or more and 2 bits, 4 bits, 16 bits, 24 bits. It is preferable that all the gradations of the color density encoded diagrams and the color density encoded diagrams 79r, 79g, and 79b of the training image are the same gradation.

In the first to third embodiments described above, although the processing units 10A, 20B, and 10B generate the respective color density encoded diagrams from the training images in step S10, a matrix table in which each pixel is previously encoded according to the gradation also may be used as the training image. The processing units 10A, 20B, and 10B may acquire training images directly from a virtual slide scanner or the like, for example, as color density encoded diagrams. Similarly, although the processing units 20A, 20B, and 10B generate the color density encoded diagrams 79r, 79g, and 79b for R, G, and B colors from the analysis target image 78 in step S21, a matrix table in which each pixel is previously coded according to the gradation may be used as the analysis image. That is, the processing units 20A, 20B, 10B may directly obtain the color density encoded diagrams 79r, 79g, 79b from a virtual slide scanner or the like.

In the first to third embodiments described above, RGB is used for the color space when generating the color density encoded diagrams 72 and 79 from the first training images 70 and 78 of color, however, the color space is not limited to RGB. In addition to RGB, various color spaces such as YUV, CMY, and CIE L * a * b * can be used.

In the first to third embodiments, density values of each pixel are stored in the order of red (R), green (G), and blue (B) in the layer structure training data and the analysis data 80, however, the order of storing and handling density values is not limited to same. For example, the density values may be stored in the order of blue (B), green (G), and red (R), and the order of arrangement of density values in the layer structure training data and the order of arrangement of density values in the analysis data 80 may be the same.

In the first to third embodiments described above, although the processing units 10A, 20B, and 10B binarize the gradation of each pixel of the input second training image 71R1, the fourth training image 71R2, and the sixth training image 71R3 to generate a second preliminary training data 71R1N, the fourth preliminary training data 71R2N, and the sixth preliminary training data 71R3N in step 12, the second preliminary training data 71R1N, the fourth preliminary training data 71R2N and the sixth preliminary training data 71R3N binarized in advance also may be acquired.

Although the processing units 10A and 10B are realized as an integrated device in the first to third embodiments, the processing units 10A and 10B need not be integrated devices, and may be any of a CPU 11, a memory 12, a storage unit 13 and the like arranged in different locations and connected via a network. The processing units 10A and 10B, the input unit 16, and the output unit 17 are not necessarily arranged in one place, and they may be arranged separately from each other and connected to each other so as to communicate with each other via a network. The processing units 20A, 20B, 20C are also the same as the processing units 10A, 10B.

Although each function block of the training data generation unit 101, the training data input unit 102, the algorithm update unit 103, the analysis data generation unit 201, the analysis data input unit 202, the analysis unit 203, and the nucleus region detection unit 204 is executed by a single CPU 11 or a single CPU 21 in the first to third embodiments, these function blocks are not necessary executed on a single CPU, and also may be distributedly executed among a plurality of CPUs. Each of these functional blocks also may be distributedly executed by a plurality of GPUs, or may be distributedly executed by a plurality of CPUs and a plurality of GPUs.

In the second and third embodiments described above, programs for performing the process of each step described in FIGS. 11 and 14 are stored in the storage units 13 and 23 in advance. Alternatively, the program may be installed in the processing units 10B and 20B from a computer readable non-transitory tangible recording medium 98 such as a DVD-ROM or a USB memory. Alternatively, the processors 10B and 20B may be connected to the network 99, and the program may be downloaded and installed from, for example, an external server (not shown) via the network 99.

In the first to third embodiments, the input units 16 and 26 are input devices such as a keyboard or a mouse, and the output units 17 and 27 are realized as a display device such as a liquid crystal display. Alternatively, the input units 16 and 26 and the output units 17 and 27 may be integrated and realized as a touch panel type display device. Alternatively, the output units 17 and 27 may be configured by a printer or the like, and the label value 83 of the analysis result or the layer structure nucleus region weighted image 84 may be printed and output.

Although the imaging device 300 is directly connected to the depth learning device 100A or the image analysis device 100B in the first to third embodiments, the imaging apparatus 300 also may be connected via the network 99 to the deep learning apparatus 100A, or may be connected to the image analyzing apparatus 100B. Similarly, although the imaging apparatus 400 is directly connected to the image analysis apparatus 200A or image analysis apparatus 200B, the imaging apparatus 400 also may be connected to the image analysis apparatus 200A or the image analysis apparatus 200B via the network 99.

Verification of Learned Deep Layer Learning Algorithm

A deep learning process and image analysis process were performed in the stand-alone type system shown in the second embodiment. Normal stomach tissue obtained from monkey's stomach was used as a target for learning. Image analysis processing using the learned deep layer learning algorithm was performed and it was confirmed that the analysis result was appropriate. Details of learning data and analysis data are as follows.

Learning data: 12 images obtained by dividing the whole slide image into 512

Analysis data for verification: 2 images obtained by dividing the hole slide image into 512

Creation of Training Data and Learning

A bright-field image of the stomach stained with HE and a hole slide image (WSI) of DAPI staining were analyzed using a virtual slide scanner (NanoZoomer-XR (Hamamatsu Photonics; scanning resolution: 0.46 μm/pixel at the 20× mode scan, and 0.23 μm/pixel at 40× mode scan)). The imaging magnification was 40 times. A first training image 70R1, a third training image 70R2 and a fifth training image were extracted for each region of the first layer structure (mucosal epithelial cell layer), the second layer structure (submucosal layer), the third layer structure (muscle layer) from the hole slide image including the region of the bright field image including the tissue to be learned. Based on the bright field image of each layer structure, the color density values of each color of R, G, B were gradated with 8 bits to generate a color density coded image of each color of R, G, B. A label value ("1" for the first layer structure, "2" for the second layer structure, "3" for the third layer structure) for distinguishing each layer structure also was assigned, and the first preliminary training data 70R1L, third preliminary training data 70R2L, and fifth preliminary training data 70R3L were generated.

A second training image 71R1, a fourth training image 71R2, and a sixth training image 71R3 corresponding to the first training image 70R1, the third training image 70R2, and the fifth training image 70R3 were extracted from the DAPI-stained fluorescence image. Using the preset threshold values for the second training image 71R1, the fourth training image 71R2, and the sixth training image 71R3, the color density values were converted to binary values for the cell nucleus region and the other region to prepare the second preliminary training data 71R1N, fourth preliminary training data 71R2N, and sixth preliminary training data 71R3N. The second training data 73R2, the fourth training data 73R2, and the sixth training data 73R3 were respectively generated from the first preliminary training data 70R1L and the second preliminary training data 71R1N, the third preliminary training data 70R2L and the fourth preliminary training data 71R2N, the fifth preliminary training data 70R3L and the sixth preliminary training data 71R3N.

Thereafter, the first training data 72R1*r*, 72R1*g*, 72R1*b* and the second training data 73R2 were combined to create the first layer structure training data. The second training data 72R2*r*, 72R2*g*, 72R2*b* and the fourth training data 73R2 were combined to create the second layer structure training data. The third layer structure training data was prepared by combining the fifth training data 72R3r, 72R3g, 72R3b and the sixth training data 73R3. Each layer structure training data thus created was divided into window sizes of 113×113 pixels, and the training data of the divided window sizes was used as an input layer for learning by the neural network. For example, the 113×113 pixels adopted as the window size is a size that supports including in the window the entire shape of the cell nucleus region of at least one cell among the plural cells of about two to nine cells.

Analysis Target Image Preparation

Similar to the training data, a hole slide image of the bright field image of the HE-stained monkey stomach was color-imaged using a virtual slide scanner. The imaging magnification was 40 times. Thereafter, color density encoded diagrams of each color of R, G, and B were created based on the captured bright field image, and an analysis target image was created by combining the color density encoded diagrams of each of the created R, G, B colors.

Analysis Result

Analysis data with a window size of 113×113 pixels were created around each pixel of the analysis target image and analysis data for the created window size were input to the learned neural network. Based on the analysis result output from the neural network, the nucleus region of the first layer structure, the nucleus region of the second layer structure, the nucleus region of the third layer structure, and the region (background) other than the nucleus region were classified, and the nucleus region of each layer structure was processed so as to display white and the region other than the nucleus region was processed so as to display black. The analysis results are is shown in FIG. 21.

Figure 21A:
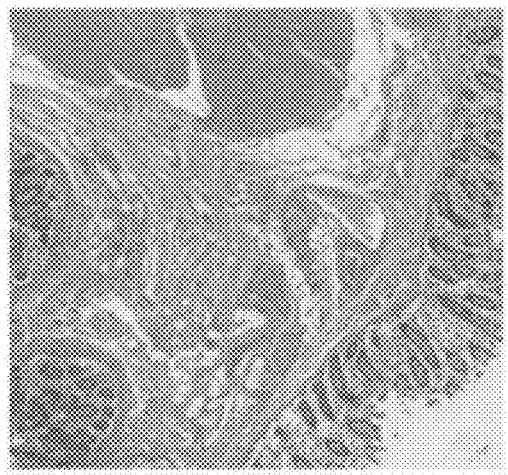
FIG. 21A is a bright-field image obtained by staining the stomach tissue with HE staining.
Figure 21B:
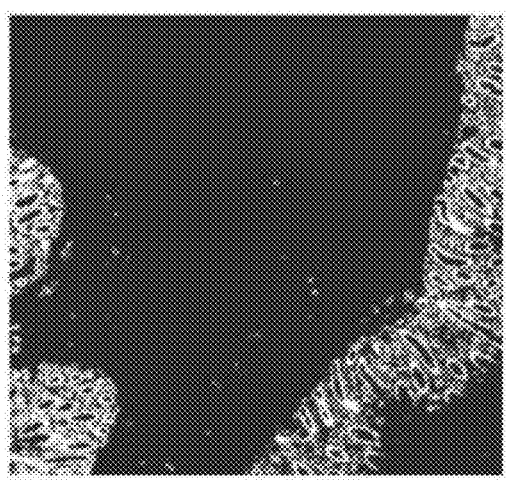
FIG. 21B is a diagram showing a nucleus region of a first layer structure obtained by the analysis process.
Figure 21C:
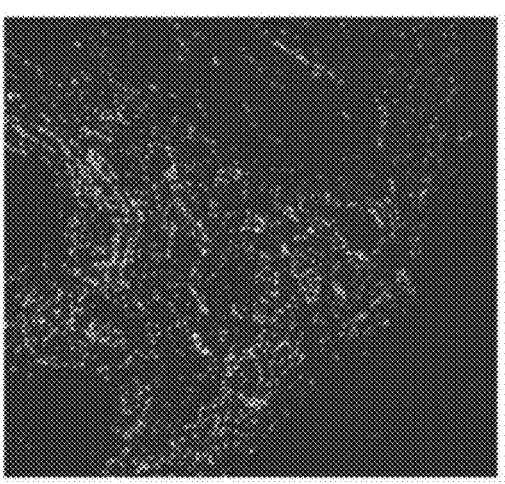
FIG. 21C is a diagram showing a nucleus region of a second layer structure obtained by the analysis process.
Figure 21D:
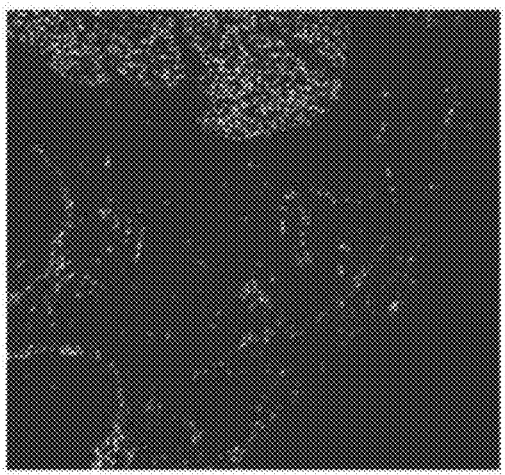
FIG. 21D is a diagram showing a nucleus region of a third layer structure obtained by the analysis process.
Figure 21E:
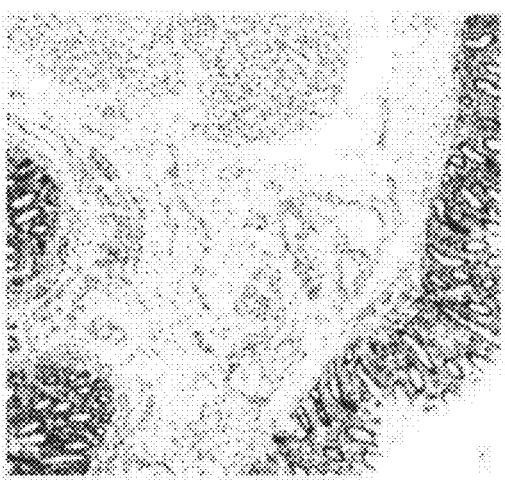
FIG. 21E is a diagram in which the nucleus region of the first layer structure, the nucleus region of the second layer structure, and a region other than the nucleus region of the third layer structure obtained by the analysis process is displayed in white.
Figure 21F:
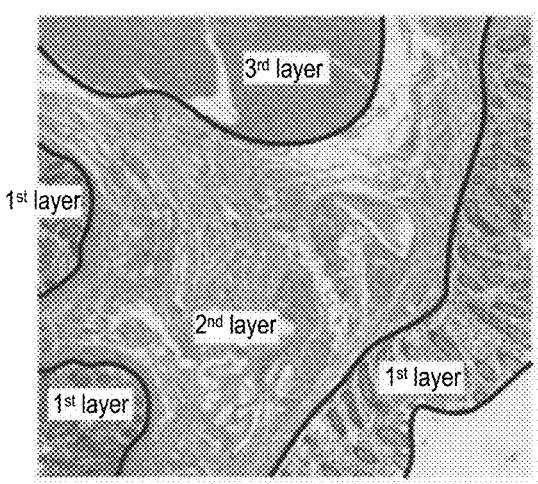
FIG. 21F shows a diagram in which the determination result of each layer is superimposed on the first training image.

FIG. 21A is a bright field image captured by HE staining of the gastric tissue, and it is an analysis target image. FIG. 21B is a diagram showing a nucleus region of a first layer structure obtained by the analysis process. The nuclear region of the mucosal cell was displayed in white with high precision. FIG. 21C is a diagram showing a nucleus region of a second layer structure obtained by the analysis process. The nucleus region of the submucosal cell was displayed in white with high precision. FIG. 21D is a diagram showing a nucleus region of a third layer structure obtained by the analysis process; The smooth muscle layer of the stomach displayed nuclear regions with white accurately in both inner circular muscle and an external longitudinal muscle. In addition, the smooth muscle layer of the blood vessel and the nuclear region of the smooth muscle cell of the muscularis mucosae were also identified as the nuclear region of the third layered structure. FIG. 21E is a diagram in which the nucleus region of the first layer structure, the nucleus region of the second layer structure, and a region other than the nucleus region of the third layer structure obtained by the analysis process is displayed in white. Regions other than nucleus such as connective tissue were detected with high accuracy. FIG. 21F shows a diagram in which the determination result of each layer is superimposed on the first training image.

From the above results, a deep learning algorithm, in which each region of the normal stomach first layer structure (mucosal epithelial cell layer), the second layer structure (submucosal layer), and the third layer structure (muscle layer) are learned as training images, can accurately detect the mucosal epithelial cell layer, the submucosal layer, and the muscular layer of the stomach used as a training target. In addition, based on the learning data of the muscular layer of the stomach can also detect the muscular layer of blood vessels composed of the same smooth muscle cells and the muscularis mucosae, the learned deep layer algorithm of the present invention was considered to be able to determine not only the tissue-specific layer structure, but also the cell from which the nucleus region originated for each cell. In other words, the learned deep layer algorithm of the present invention was considered to be able to discriminate among various tissues.

What is claimed is:

1. An image analysis method for analyzing an image of a tissue collected from a subject using a deep learning algorithm of a neural network structure, the image analysis method comprising:
   generating analysis data from an analysis target image that includes analysis target tissue, wherein the analysis target tissue includes a plurality of layer structures;
   inputting the analysis data to the deep learning algorithm; and
   generating data indicating the plurality of layer structures configuring the tissue in the analysis target image based on the analysis data, by the deep learning algorithm, wherein the data indicates a nucleus region of a layer structure in the analysis target tissue and the data further indicates the layer structure among the plurality of layer structures to which the nucleus region belongs.

2. The image analysis method according to claim 1, wherein
   the analysis target image is an image of a sample for histological diagnosis.

3. The image analysis method according to claim 1, wherein
   the analysis target image is a bright field image of a stained analysis target tissue.

4. The image analysis method according to claim 1, wherein
   the layer structure comprises at least one selected from an epithelial cell layer, an endothelial cell layer, a connective tissue layer, and a muscle layer.

5. The image analysis method according to claim 1, wherein
   the tissue is taken from the stomach, small intestine, or large intestine, and
   the layer structure includes at least one selected from among a mucosal epithelial cell layer, a mucosal lamina propria, a muscularis mucosae, a submucosal layer, an intrinsic muscle layer, and a serosal layer.

6. The image analysis method according to claim 1, wherein
   the tissue is collected from a trachea or a bronchus, and
   the layer structure comprises at least one selected from among a mucosal epithelial cell layer, a mucosal lamina propria, a smooth muscle layer, a submucosal layer.

7. The method according to claim 1, wherein
   the tissue is collected from the uterine body, and
   the layer structure comprises at least one selected from a mucosal epithelial cell layer, a mucosal lamina propria, a muscle layer, an adventitia layer.

8. The image analysis method according to claim 1, wherein
   the tissue is collected from a gall bladder; and
   the layer structure includes at least one selected from a mucosal epithelial cell layer, a mucosal lamina propria, a muscle layer, and a serosal layer.

9. The image analysis method according to claim 1, wherein
   the tissue is a glandular tissue collected from tissues other than the stomach, small intestine, large intestine and uterus, and the layer structure comprises at least one selected from a gland epithelial cell layer, a muscle layer, and a connective tissue layer.

10. The method according to claim 1, wherein
the tissue is a heart, and
the layer structure comprises at least one selected from among an endocardial layer, a myocardium layer, an epicardial layer, and an epicardial tissue.

11. The image analysis method according to claim 1, wherein
the tissue is a blood vessel, and
the layer structure comprises at least one selected from an endothelial cell layer and a muscle layer.

12. The image analysis method according to claim 1, wherein
the data indicating the layer structure configuring the tissue are data for distinguishing a plurality of types of layers configuring the tissue.

13. The image analysis method according to claim 1, wherein
in the generating analysis data from an analysis target image, a plurality of analysis data are generated for each region having a predetermined number of pixels from one analysis target image.

14. The image analysis method according to claim 1, wherein
the deep learning algorithm assigns a label value indicating a layer structure for each pixel to the input analysis data.

15. The image analysis method according to claim 1, wherein
the deep layer learning algorithm has learned the training data generated from:
a bright field image captured under a bright field microscope of a stained image of a sample prepared by applying a bright field observation stain to a tissue collected from a subject, and
a fluorescence image of a cell nucleus captured under fluorescence observation by a fluorescence microscope of a stained sample prepared by fluorescent nuclear staining of a same or a corresponding sample of the bright field image.

16. The image analysis method according to claim 15, wherein
the training data comprise label values indicating the layer structure for each pixel of the bright field image.

17. The image analysis method according to claim 15, wherein
the training data are generated for each region of a predetermined number of pixels in the bright field image.

18. An image analysis apparatus for analyzing an image of a tissue collected from a subject using a deep learning algorithm of a neural network structure, the image analysis apparatus comprising:
a processor configured to:
generate analysis data from an analysis target image that includes a tissue to be analyzed, wherein the tissue includes a plurality of the layer structures;
input the analysis data to a deep learning algorithm; and
generate data indicating the plurality of layer structures configuring the tissue in the analysis target image based on the analysis data, by the deep learning algorithm, wherein the data indicates a nucleus region of a layer structure in the analysis target tissue and the data further indicates the layer structure among the plurality of layer structures to which the nucleus region belongs.

19. The image analysis method according to claim 1, wherein
the layer structure is formed from cells binding each other, extracellular matrices binding each other, or cells binding extracellular matrices.

20. A learned deep learning algorithm generating method comprising:
acquiring first training data corresponding to a first training image comprising a layer structure of a first learning object included in a training image;
acquiring second training data corresponding to a second training image indicating a nuclear region in the first training image;
acquiring third training data for a third training image comprising a layer structure of a second learning object included in the training image;
acquiring fourth training data corresponding to a fourth training image indicating a nuclear region in the third training image;
acquiring fifth training data corresponding a fifth training image comprising a layer structure of a third learning object included in the training image;
acquiring sixth training data corresponding to a sixth training image indicating a nuclear region in the fifth training image;
causing the neural network to learn a relationship between the first training data and the second training data;
causing the neural network to learn a relationship between the third training data and the fourth training data; and
causing the neural network to learn a relationship between the fifth training data and the sixth training data.

21. The image analysis apparatus according to claim 18, wherein
the layer structure is formed from cells binding each other, extracellular matrices binding each other, or cells binding extracellular matrices.

* * * * *